United States Patent
Sasagawa et al.

(10) Patent No.: US 7,210,836 B2
(45) Date of Patent: May 1, 2007

(54) DISPLAY UNIT AND ELECTRONIC APPARATUS WITH DISPLAY UNIT

(75) Inventors: Tomohiro Sasagawa, Tokyo (JP); Akimasa Yuuki, Tokyo (JP); Naoto Sugawara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 148 days.

(21) Appl. No.: 10/523,205

(22) PCT Filed: Sep. 19, 2003

(86) PCT No.: PCT/JP03/12024

§ 371 (c)(1), (2), (4) Date: Jan. 27, 2005

(87) PCT Pub. No.: WO2004/027492

PCT Pub. Date: Apr. 1, 2004

(65) Prior Publication Data
US 2005/0276071 A1  Dec. 15, 2005

(30) Foreign Application Priority Data
Sep. 19, 2002  (JP) .............................. 2002-273064

(51) Int. Cl.
F21V 7/04 (2006.01)

(52) U.S. Cl. ...................... 362/606; 362/607; 362/333; 362/620; 362/626; 362/339

(58) Field of Classification Search ................ 362/327, 362/329, 332, 337, 339, 617, 619, 620, 625, 362/626, 235, 242, 244, 245, 606, 607, 333; 345/102, 83–88, 97, 99, 100, 103; 349/65; 359/710

See application file for complete search history.

(56) References Cited

U.S. PATENT DOCUMENTS

| 5,483,254 | A | 1/1996 | Powell |
| 5,914,760 | A | 6/1999 | Daiku |

(Continued)

FOREIGN PATENT DOCUMENTS

JP  64-49018  2/1989

(Continued)

*Primary Examiner*—Thomas M. Sember
(74) *Attorney, Agent, or Firm*—Leydig, Voit & Mayer, Ltd.

(57) ABSTRACT

A display system includes respective light sources disposed at two opposed light input ends of a light guiding plate. A double-sided prism sheet is disposed on a light-emitting side of the light guiding plate and includes, on a first surface facing the light guiding plate, a triangular prism bank extending in a direction parallel to the light input ends of the light guiding plate. The double-sided prism sheet includes, on a second surface, opposite to the first surface, a cylindrical lens bank extending in a direction parallel to the triangular prism bank. A transmissive display panel is disposed on a light-emitting side of the double-sided prism sheet. A synchronization driving section alternatively illuminates the respective light sources so the transmissive display panel displays two different images. The light from the light sources is emitted through the transmissive display panel at respective divergent angles producing two images corresponding to right and left parallax images, producing a stereoscopic display.

7 Claims, 19 Drawing Sheets

U.S. PATENT DOCUMENTS 5,936,607 A    8/1999  Allio
2001/0026249 A1   10/2001  Bell et al.
2002/0067332 A1*   6/2002  Hirakata et al. ............ 345/102

FOREIGN PATENT DOCUMENTS

| JP | 05-107663 | 4/1993 |
| JP | 10-161061 | 6/1998 |
| JP | 2001-066547 | 3/2001 |

* cited by examiner (THICKNESS/PITCH)=1.7

(THICKNESS/PITCH)=2.3

(THICKNESS/PITCH)=2.7

(THICKNESS/PITCH)=4.0

(THICKNESS/PITCH)=4.3

(THICKNESS/PITCH)=4.7

φa = φb = 35 DEGREES

φa = φb = 34 DEGREES

φa=φb=31 DEGREES

φa=φb=30 DEGREES

DISPLAY UNIT AND ELECTRONIC APPARATUS WITH DISPLAY UNIT

TECHNICAL FIELD

The present invention relates to a display system, and particularly to a display system that is used for a mobile information terminal including a small display screen, and that enables stereoscopic vision and simultaneous display of different frames on the same screen.

BACKGROUND ART

A stereoscopic display system usually presents the two eyes of an observer with images with parallax from individual viewpoints. As methods of presenting the two eyes of the observer with images with parallax, there are two conventional methods: a method of using a pair of special spectacles; and a spectacleless method.

The method of using the spectacles switches right and left parallactic images, which are displayed alternately on a time division basis, in such a manner that the images reach the two eyes of the observer via the spectacles. Thus, to present the stereoscopic display to the observer, the observer must wear the spectacles, which involves an unpleasant and uncomfortable feeling.

On the other hand, the spectacleless method usually employs a lenticular lens or parallax barrier. In this method, a display system displays right and left parallactic images for each vertical pixel line, and has a lenticular lens or parallax barrier mounted in such a manner that the light rays emitting from the individual pixel lines are led to the two eyes of the observer. Thus, it must display the right and left parallactic images for each vertical pixel line of the display system. Accordingly, the pixels on a line of the display system is divided into right pixels and left pixels, thereby halving the number of pixels of the image. In addition, it is difficult for the lenticular lens system to switch between the presence and absence of the lenticular lens. Consequently, to display a plane image, the lenticular lens system must display different pixel lines to the two eyes as in the case of the stereoscopic image, thereby lowering the resolution of the plane image display. As for the parallax barrier system, it can eliminate the parallax barrier during the plane image display by configuring the parallax barrier by a liquid crystal device. Consequently, it can carry out the plane display at the original resolution of the display panel. However, since the parallax barrier system cuts off part of light rays from a light source with the parallax barrier during the stereoscopic display, it presents a problem of darkening the display.

As a method to circumvent the problem, a method is proposed which displays the right and left parallactic images on a transmissive display panel on a time division basis in the same manner as the method of using the spectacles, and switches the directivity of a light source that illuminates the display panel, thereby guiding the right and left parallactic images to the two eyes. For example, FIG. 22 shows a system proposed by Cambridge University. It comprises a transmissive display panel 4, a collimator lens 6 installed at its back, and a light source array 7 that is placed at its back and emits light successively. The light emitted from a light source cell 7a in the light source array passes through the collimator lens 6 disposed in front of the light source, and then through the transmissive display panel 4, and is converged with directivity. Accordingly, as for the image on the transmissive display panel, it is observable only in the converged direction. Thus, by switching the light-emitting cell of the light source array and the parallactic image displayed on the transmissive display panel in synchronization, the right and left parallactic images can be guided to the two eyes of the observer, thereby enabling the stereoscopic vision. The system using the light-emitting position control and the collimator lens can accurately convert the position of the light-emitting cell on the light source to the angle of illuminating light or to the visibility position through the collimator lens. As a result, the system can perform excellent directivity of the illuminating light, and hence can achieve high quality stereoscopic vision by good separation between right and left images.

As a method of downsizing the foregoing system, Japanese patent application laid-open Nos. 5-107663/1993 and 10-161061/1998 propose a method of dividing light rays from a light source into switchable stripe-like or matrix-like light sources by switchable shutter elements such as a liquid crystal device, and then achieving the directivity of the light source by a lenticular sheet which is placed in front of the light source and serves as a collimator lens. Although the method can carry out the stereoscopic display without lowering the resolution, it has a problem of decreasing light efficiency and darkening display because it cuts off part of the light rays from the light source to create the stripe-like light sources. In addition, since it requires expensive liquid crystal shutter elements in addition to the display panel to create the stripe-like light sources, it has a problem of being unable to implement a low-cost system.

FIG. 23 shows another method proposed in Japanese patent application laid-open No. 2001-66547. Instead of achieving the directivity of the light source by the collimator lens, the method combines two pairs of light sources 1a and 1b with backlight light guiding plates 2a and 2b, and switches the directivity of the illuminating light using light deflection effect by a prism sheet 8 disposed under a liquid crystal panel 4, thereby obviating the need for the expensive switchable shutter elements. Since the method controls the directivity of the illuminating light by only the adjustment of the light emitting luminous intensity distribution from the light guiding plates, it is more difficult for the method to obtain the sufficient directivity than the foregoing system that can determine the directivity of the illuminating light explicitly by the shutter elements and the collimator lens. An example of Japanese patent application laid-open No. 2001-66547 states that the angle of the light emitting from the light guiding plate has its peak at 70 degrees and is distributed from 60 to 80 degrees, the values are considered to vary to some extent depending on the shape of the light guiding plates and light producing structure. Thus, to achieve uniform brightness with maintaining the light emitted angle in that range, it is necessary to strictly limit the shape of the light guiding plates and their design. Thus, it has problems in that it easily brings about crosstalk between right and left because of the degradation in the directivity, and it must prepare two pairs of the light guiding plates as in the foregoing Japanese patent application laid-open No. 2001-66547 to obtain good luminous intensity distribution characteristics.

As described above, the conventional stereoscopic display systems have the following problems. First, the method of using the spectacles has inconvenience of wearing the spectacles. As for the spectacleless method, the method of using the lenticular or parallax barrier has a problem of decreasing the resolution of the stereoscopic image or plane image, or reducing the brightness. As for the conventional method of switching the directivity of light, the method of using the switching shutter elements and collimator lens is costly because it requires expensive switching shutter elements. The method of directly controlling the directivity of light by the light guiding plates has a problem of easily bringing about crosstalk between right and left because of the difficulty of controlling the directivity, and a problem of complicating the configuration and being expensive because it uses two pairs of the backlights.

The present invention is implemented to solve the foregoing problems. Therefore it is an object of the present invention to provide a display system capable of implementing high quality stereoscopic images with little crosstalk without decreasing the resolution of both the stereoscopic and plane images, and of achieving stereoscopic vision or displaying different frames simultaneously on the same screen without using the spectacles, which is simple, low cost and suitable for portable information terminals.

DISCLOSURE OF THE INVENTION

According to one aspect of the present invention, there is provided a display system including: a light guiding plate; light sources disposed at two opposite light input ends of the light guiding plate; a double-sided prism sheet that is disposed on a light emitting face side of the light guiding plate, and that has on a first surface facing the light guiding plate a triangular prism bank extending in a direction parallel to the light input ends of the light guiding plate, and on a second surface opposite to the first surface a cylindrical lens bank extending in a direction parallel to the triangular prism bank; and a transmissive display panel disposed on a light emitting face side of the double-sided prism sheet, wherein a synchronization driving section causes the transmissive display panel to emit, in synchronization with right and left parallactic images displayed alternately on the transmissive display panel, light rays from the light sources at angles corresponding to right and left parallax.

According to the display system that includes the light guiding plate; the light sources disposed at two different light input ends of the light guiding plate; the double-sided prism sheet that is disposed on a light emitting face side of the light guiding plate, and that has on a first surface facing the light guiding plate a triangular prism bank extending in a direction parallel to the light input ends of the light guiding plate, and on a second surface opposite to the first surface a cylindrical lens bank extending in a direction parallel to the triangular prism bank; the transmissive display panel disposed on a light emitting face side of the double-sided prism sheet; and the synchronization driving section for causing the transmissive display panel to display parallactic images in synchronization with the light sources, wherein the light rays from the light sources are emitted through the transmissive display panel at the angles corresponding to the right and left parallax. Thus, the display system offers advantages of being able to achieve high quality stereoscopic vision with little crosstalk and to display different frames simultaneously on the same screen.

BEST MODE FOR CARRYING OUT THE INVENTION

The best mode for carrying out the invention will now be described with reference to the accompanying drawings to explain the present invention in more detail.

Embodiment 1

Figure 1A:
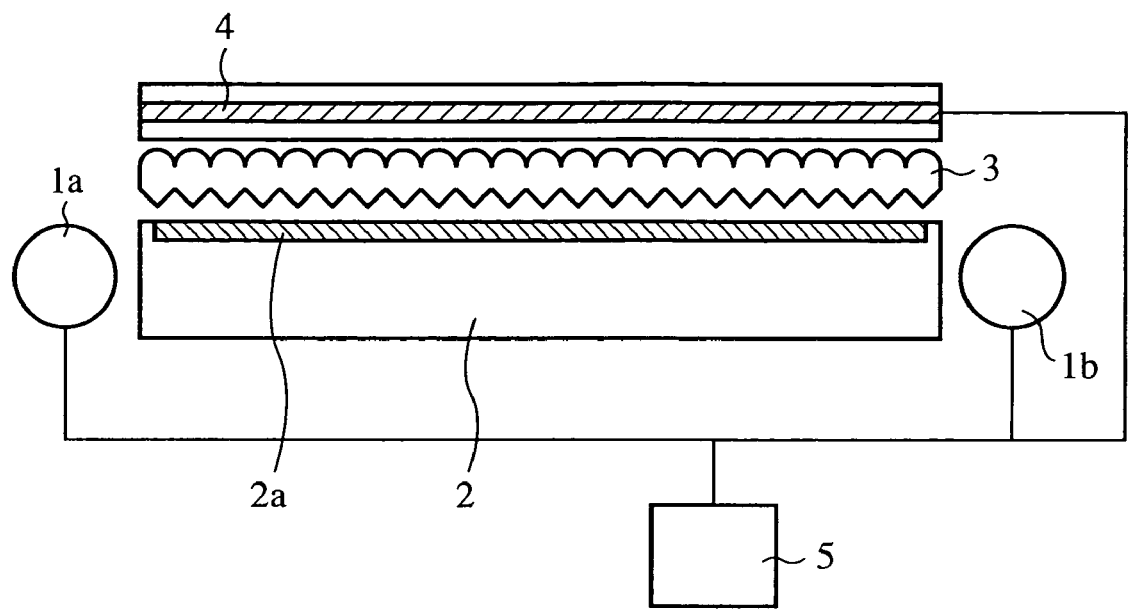
FIGS. 1A and 1B are side views each illustrating a main portion of a display system of an embodiment 1 in accordance with the present invention.
Figure 1B:
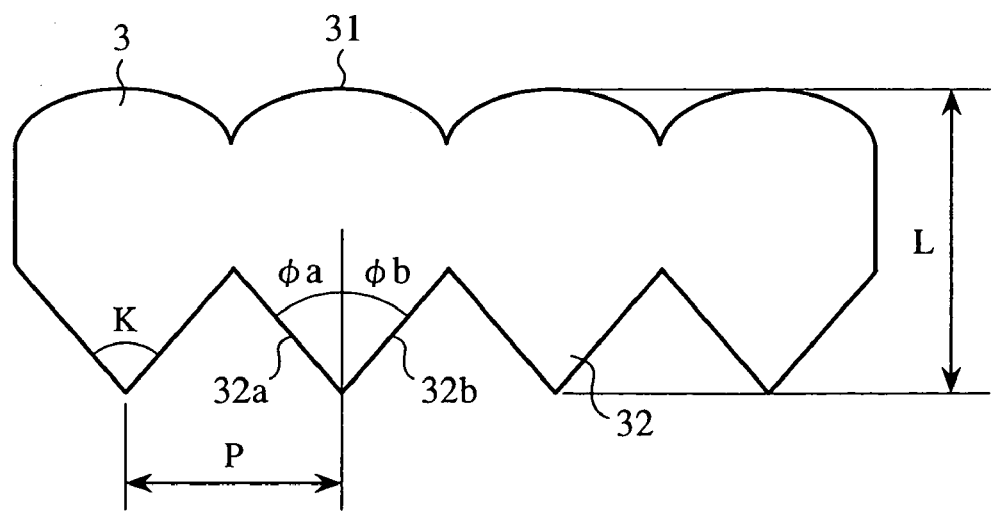

FIGS. 1A and 1B are side views illustrating a main portion of a display system for a portable information apparatus of an embodiment 1 in accordance with the present invention.

In FIGS. 1A and 1B A, reference numerals 1a and 1b each designate a light source, and the reference numeral 2 designates a light guiding plate which has a rectangular side and is flat-shaped as a whole, and has a predetermined width in the direction normal to the sheet of paper. At both light input ends of the light guiding plate 2, the light sources 1a and 1b are placed oppositely. The reference numeral 2a designates a light extracting section formed on a surface of the light guiding plate 2 by reflection print, rough surface processing or the like.

The reference numeral 3 designates a double-sided prism sheet placed on the emitting surface of the light guiding plate 2, and 4 designates a transmissive liquid crystal panel, in which a shaded portion designates a liquid crystal layer.

The reference numeral 5 designates a control section for controlling the synchronization between the light sources 1a and 1b and the display switching of parallactic images on the transmissive liquid crystal panel 4.

FIG. 1B is a side view illustrating an enlarged shape of the double-sided prism sheet 3. The double-sided prism sheet 3 is composed of a material with a refractive index of 1.5. It has on its underside a triangular prism bank 32 that extends in the direction normal to the sheet of paper, and includes isosceles triangles each having a vertex angle K of 60 degrees and a ridgeline extending in the direction parallel to the light input ends of the light guiding plate 2. In addition, it has on its top surface a cylindrical lens bank 31 that extends in the direction parallel to the triangular prism bank 32 (in the direction normal to the sheet of paper) at the same pitch P as the triangular prism bank 32. The curvature of individual lenses of the cylindrical lens bank 31 is adjusted such that their focal points coincide with the vertices of the triangular prism bank 32 on the underside. The pitch P of the cylindrical lens bank 31 on the top surface and the thickness L of the double-sided prism sheet 3 are formed such that the ratio (thickness L/pitch P) is three.

Figure 2A:
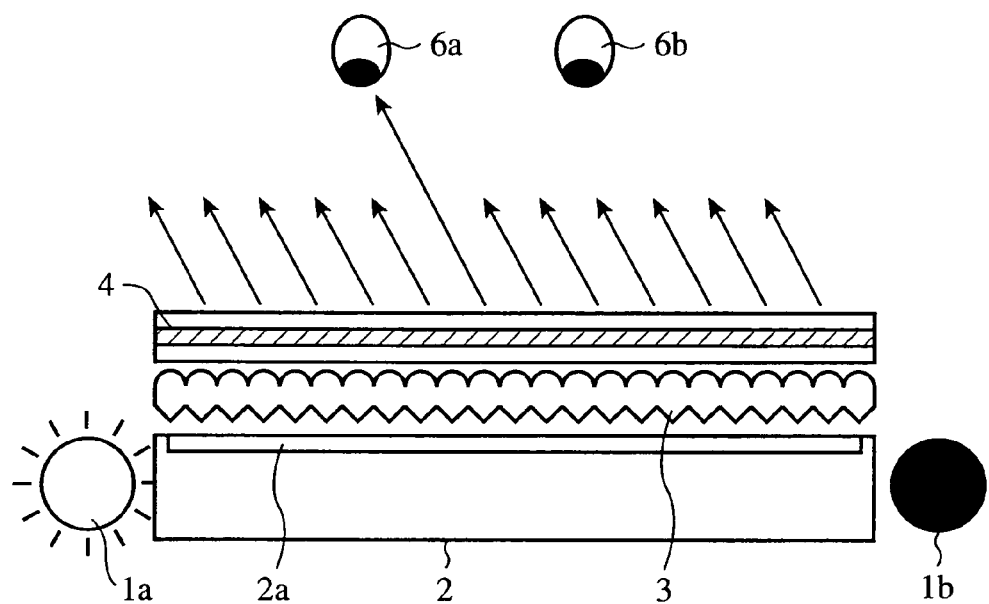
FIGS. 2A and 2B are structural diagrams each illustrating the operation of the display system of the embodiment 1 in accordance with the present invention.
Figure 2B:
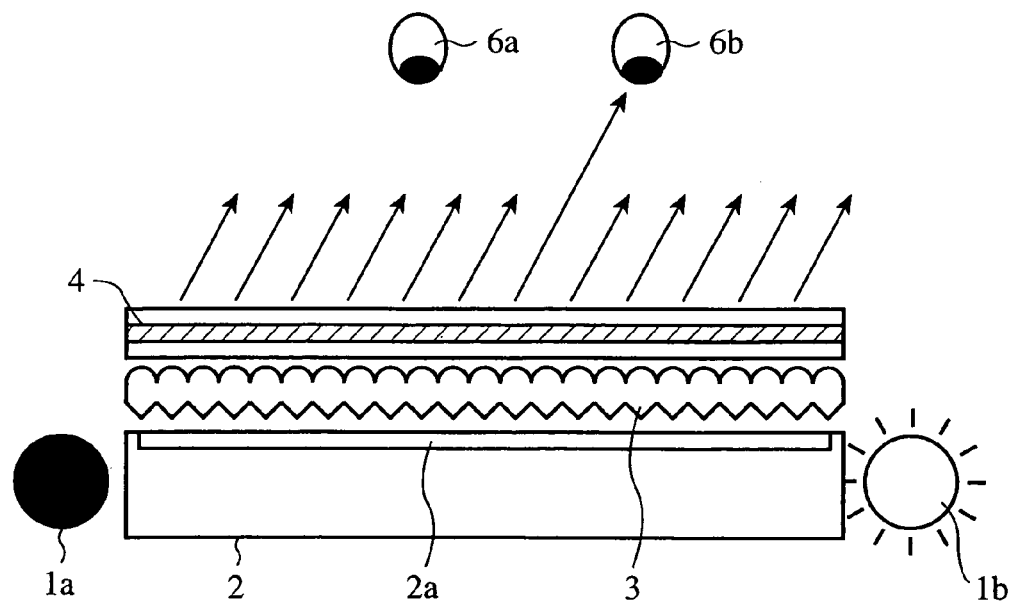
Figure 3A:
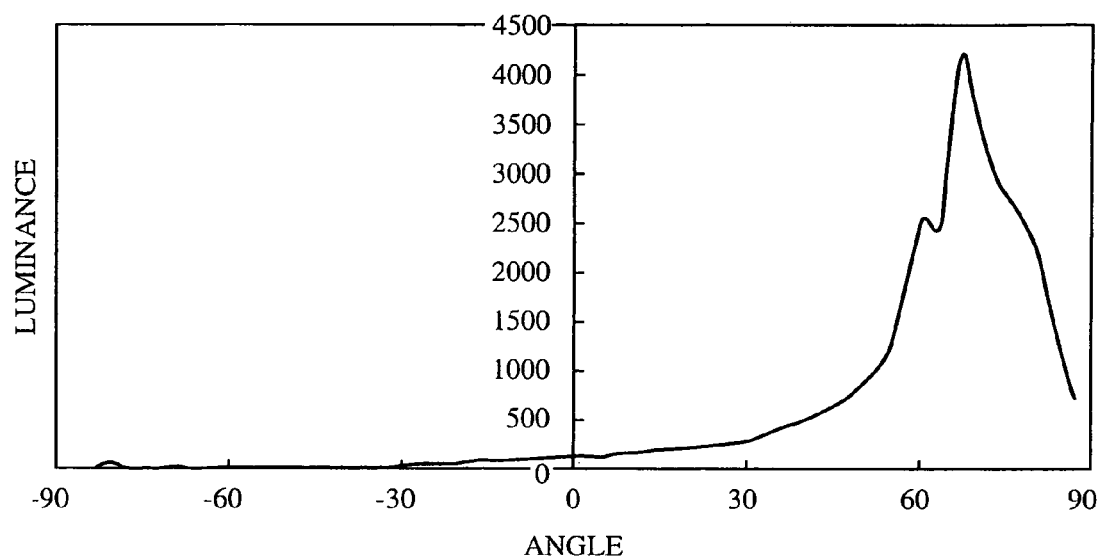
FIGS. 3A and 3B are diagrams illustrating luminous intensity distribution characteristics of the light rays emitted from the light guiding plate and display panel of the display system of the embodiment 1 in accordance with the present invention.
Figure 3B:
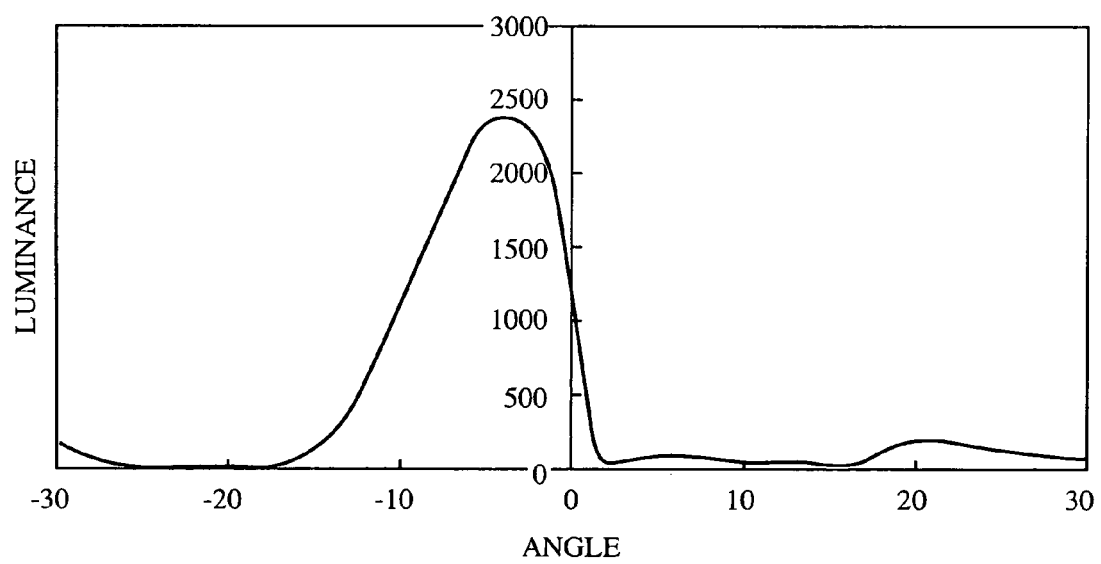

Next, the operation of the stereoscopic vision will be described with reference to FIGS. 2A and 2B. In FIG. 2A, only the left side light source 1a is switched on, and the right side light source 1b is switched off. In this case, the light emitted from the light source 1a propagates through the light guiding plate 2, and is output from the light guiding plate 2 via the light extracting section 2a on the light guiding plate 2. The light emitted from the light guiding plate 2 has at the emission the luminous intensity distribution with an emitted angle greatly inclined toward the direction opposite to the light source 1a as indicated by the luminous intensity distribution characteristics shown in FIG. 3A. In FIGS. 3A and 3B, the horizontal axis represents the light emitted angle from the light source 1a or 1b, where zero degree indicates the forward direction (the direction of the normal to the transmissive liquid crystal panel), and the angle inclined toward the right side is assumed to be positive. The vertical axis represents luminance (in terms of a unit $cd/m^2$). When the light with such angle distribution passes through the double-sided prism sheet 3, it undergoes refraction and reflection by the double-sided prism sheet 3. Thus, it has the luminous intensity distribution as shown in FIG. 3B, which has strong intensity in a range from zero to about −15 degrees on the left side of the forward direction, and which has little light emission in the range from zero to about 15 degrees on the right side thereof. Then, the light passes through the transmissive liquid crystal panel 4 to be emitted to an observer as shown in FIG. 2A with maintaining the luminous intensity distribution. Assume that the distance between the left eye 6a and the right eye 6b of the observer is about 65 mm, and the viewing distance from the transmissive liquid crystal panel 4 to the observer is about 300 mm. Then, the angle between the line joining the center of the transmissive liquid crystal panel 4 with the left eye 6a or the right eye 6b and the direction of the normal to the transmissive liquid crystal panel 4 is about six degrees. In other words, when the viewing distance is 300 mm, and the light emitted from the transmissive liquid crystal panel 4 has the luminous intensity distribution with sufficient intensity at an angle of six degrees toward the left, but with little light emission at an angle of six degrees toward the right, the observer can recognize the image with the left eye 6a, but cannot perceive the image because the light does not reach the right eye 6b. Thus, the luminous intensity distribution as shown in FIG. 3B enables the observer to recognize the image only by the left eye 6a. In contrast with this, when the left side light source 1a is switched off and the right side light source 1b is switched on as shown in FIG. 2B, the observer can recognize the image only by the right eye 6b conversely to the case of FIG. 2A. Thus, the observer can perceive the different parallactic images by the left eye 6a and right eye 6b by turning on the light sources 1a and 1b alternately, and by displaying the right and left parallactic images on the transmissive liquid crystal panel 4 in synchronism with the switching of the light sources 1a and 1b under the control by the synchronization control section 5, which enables the stereoscopic vision based on the parallax.

In addition, when the observer views the panel not from the front, but from the right side at an oblique angle of eight degrees, the right eye is positioned at an angle of 16 degrees on the right side, and the left eye is positioned at an angle of two degrees on the right side. In this case, the two eyes perceive only the image for the right eye as a normal plane image. In contrast, when the observer views the panel from the left side at an oblique angle of eight degrees, the left eye is positioned at an angle of 16 degrees on the left side, and the right eye is positioned at an angle of two degrees on the left side. In this case, the two eyes perceive only the image for the left eye as a normal plane image. Accordingly, displaying completely different images alternately in synchronization with the switching of the light sources 1a and 1b enables the observer to recognize the two different images displayed simultaneously on the same screen depending on the view angle of the observer.

Figure 4:
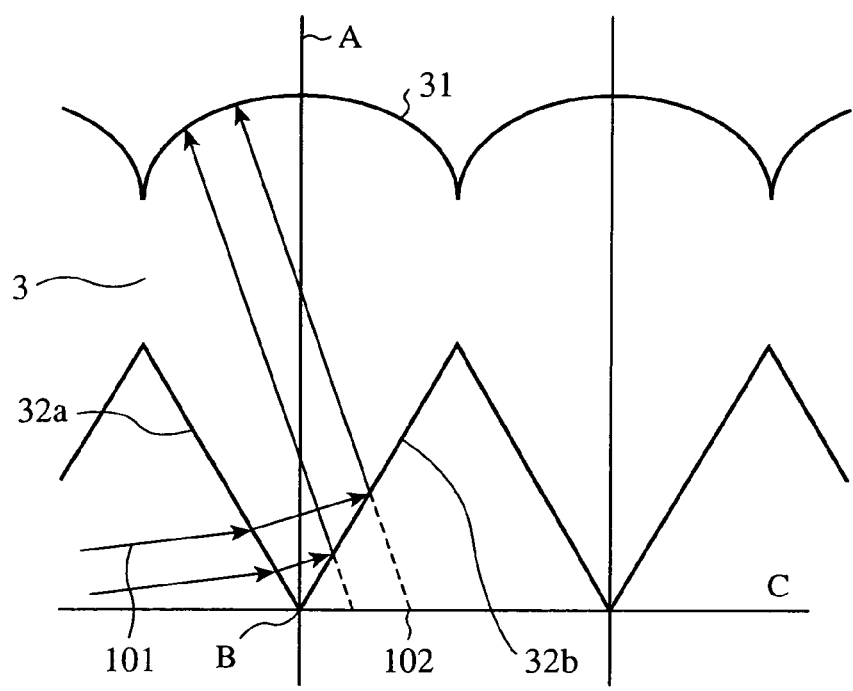
FIG. 4 is a structural diagram illustrating a transmission path through a double-sided prism sheet used in the display system of the embodiment 1 in accordance with the present invention.
Figure 5:
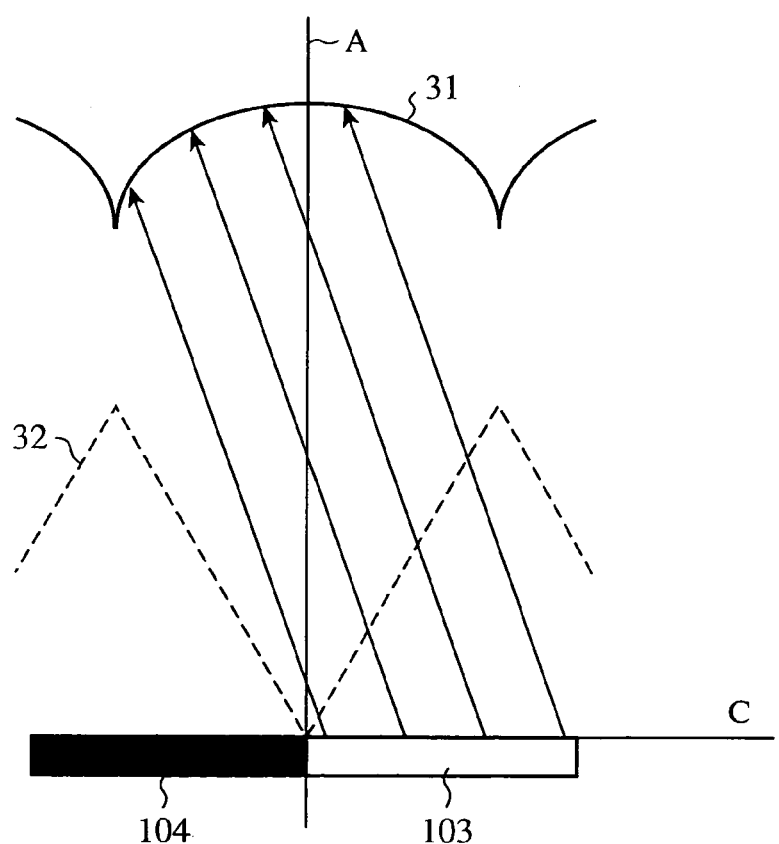
FIG. 5 is a structural diagram illustrating the operation of the double-sided prism sheet used in the display system of the embodiment 1 in accordance with the present invention.
Figure 6:
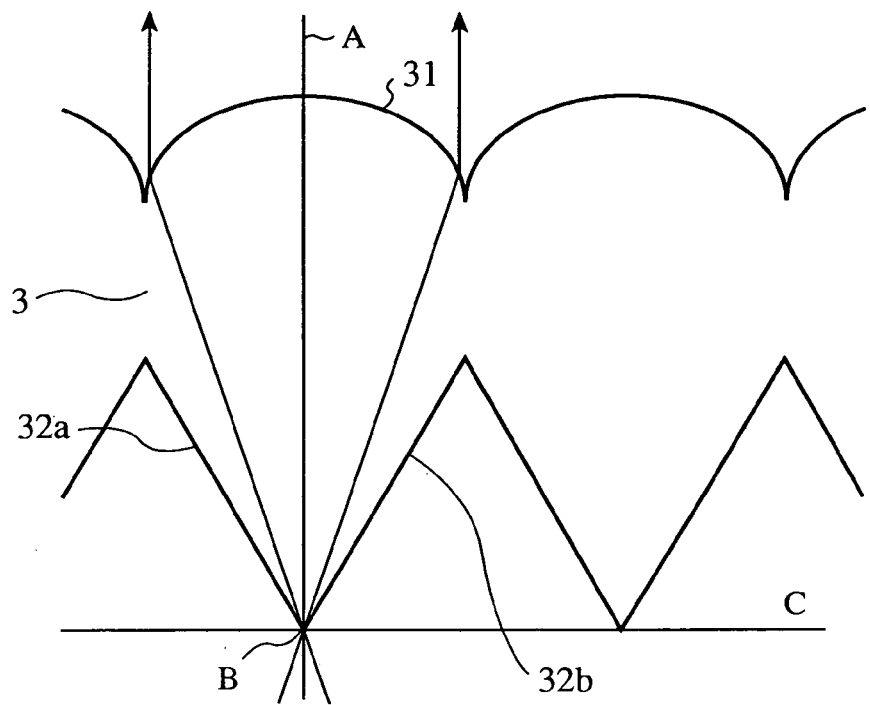
FIG. 6 is a structural diagram illustrating the position of a focal point of a lens of the cylindrical lens bank formed on the double-sided prism sheet used in the display system of the embodiment 1 in accordance with the present invention.

Next, the operation of the double-sided prism sheet 3 will be described in more detail with reference to FIGS. 4–7. FIG. 4 is a diagram illustrating the transmission path of the double-sided prism sheet; FIG. 5 is a diagram illustrating the operation of the double-sided prism sheet; FIG. 6 is a diagram illustrating the focal point of a cylindrical lens of the double-sided prism sheet; and FIG. 7 is a diagram illustrating the angle determining function of the double-sided prism sheet.

In FIG. 4, the light emitted from the light guiding plate 2 obliquely toward the right side travels through an optical path 101. The optical path 101 enters the double-sided prism sheet 3 via a slope 32a of a prism of the triangular prism bank 32 formed on the double-sided prism sheet 3, is reflected upward from a slope 32b by the total reflection, and is emitted from the cylindrical lens bank 31 (the symbol A designates the optical axis of each lens) on the top surface side right above. Assume that the reference numeral 102 designates an intersection point of the optical path line after the reflection from the slope 32b and the horizontal plane C including the vertex B of the prism of the triangular prism bank 32 formed on the double-sided prism sheet 3. Then, the light passing through the optical path 101 is equivalent to the light that is emitted from the intersection point 102 and launched into the cylindrical lens bank 31 directly. Thus, all the light rays passing through the total reflection by the slope 32b and incident onto the cylindrical lens bank 31 right above can be replaced by the light emitted from the region 103 in FIG. 5 and incident onto the cylindrical lens bank 31 right above. In FIG. 5, broken lines represent the shape of the prisms of the prism bank 32.

Furthermore, as for the light rays undergoing the total reflection by the slope 32b and incident onto the cylindrical lens bank 31 right above, none of them are emitted from the region 104 of FIG. 5 nor pass through the same optical path as the light rays that fall directly on the cylindrical lens bank 31 right above. Assume that the focal points of the cylindrical lens bank 31 coincide with the vertices B of the prisms of the triangular prism bank 32 as shown in FIG. 6. Then, a light ray undergoing the total reflection by the slope 32b and launched into the cylindrical lens bank 31 right above can be considered equivalent to the light ray that is emitted from the horizontal plane C including the focal points of the cylindrical lens bank 31 and from the right side of the optical axis A of the cylindrical lens bank 31, and that is directly launched into the cylindrical lens bank 31 right above.

Figure 7:
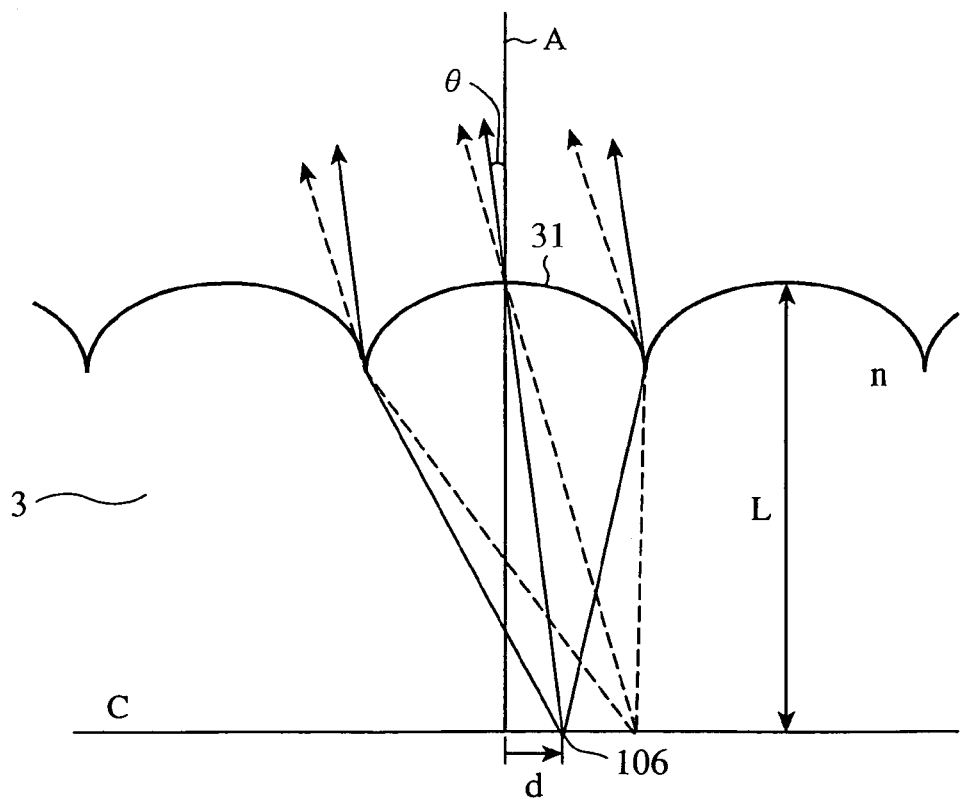
FIG. 7 is a structural diagram illustrating an angle determining function of the double-sided prism sheet used in the display system of the embodiment 1 in accordance with the present invention.

As illustrated in FIG. 7, a light ray that is emitted from a point on the horizontal plane C including the focal point of a lens of the cylindrical lens bank 31 and directly launched into the cylindrical lens bank 31 right above is equivalent to a light ray that is emitted from the cylindrical lens 31 at an angle θ given by the following expression (1) in response to the distance d of the light-emitting point from the optical axis A of the cylindrical lens 31. Thus, the position of the light-emitting point has one to one correspondence with the emitted angle.

$$\theta = -\text{Arc Tan}(nd/L) \quad (1)$$

where n is the refractive index of a material constituting the double-sided prism sheet 3, and L is the thickness of the double-sided prism sheet 3, which is equal to the focal length of the lenses of the lens bank 31.

Accordingly, all the light rays emitted from the right side of the optical axis A on the plane C is output at leftward oblique angles. Thus, the light rays undergoing the total reflection by the slope 32b and launched into the cylindrical lens 31 right above are emitted only leftward after passing the cylindrical lens 31, thereby being able to provide the luminous intensity distribution with sharp right and left separation characteristics with the normal marking the boundary as shown in FIG. 3B. In this way, the system is based on the completely same directivity control as the directivity control system using the separate light sources and the lens as proposed by Cambridge University and disclosed in Japanese patent application laid-open No. 5-107663/1993. In addition, it can implement the stereoscopic display with little crosstalk capable of achieving accurate directivity control without using the expensive liquid crystal shutter elements.

Figure 8:
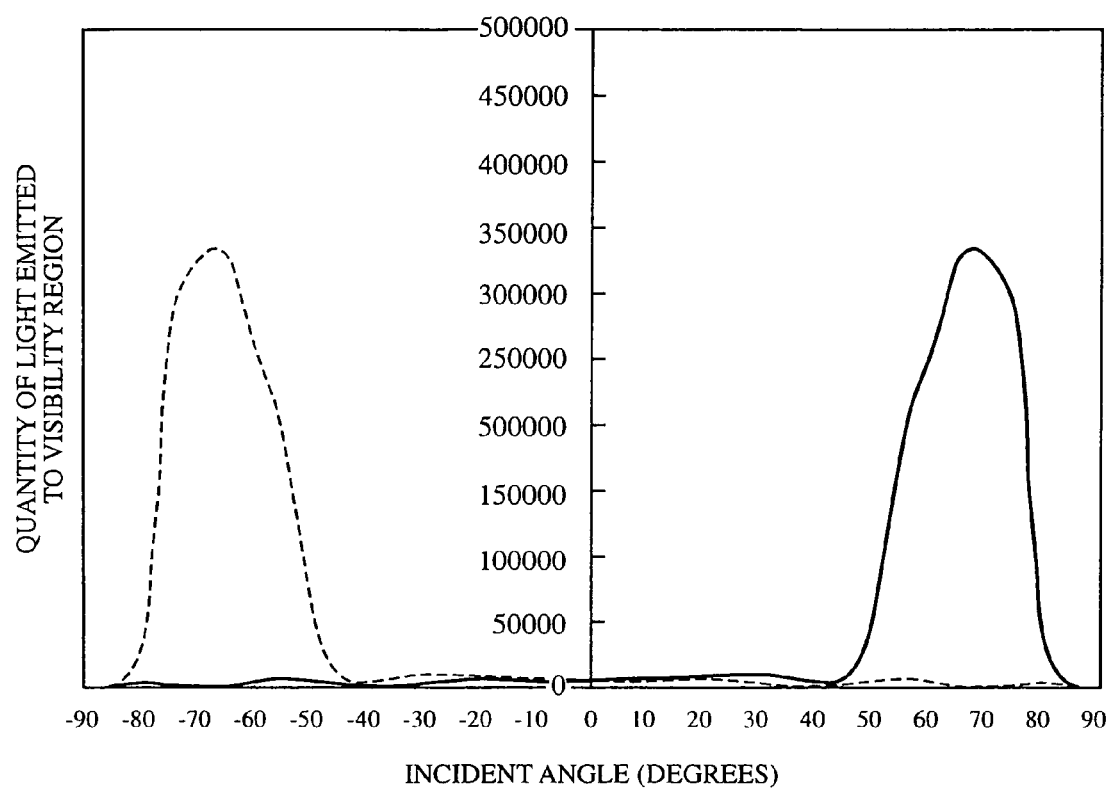
FIG. 8 is a diagram illustrating luminous intensity distribution characteristics of the double-sided prism sheet used in the display system of the embodiment 1 in accordance with the present invention.

FIG. 8 is a characteristic diagram illustrating simulation results of luminous intensity distribution characteristics of the double-sided prism sheet 3. The horizontal axis represents the incident angle onto the double-sided prism sheet 3, and the vertical axis represents the quantity of emitted light (arbitrary scale, and the values are those used by the simulation) to the visibility regions of the two eyes. In addition, the solid line represents the quantity of light emitted to the visibility region of the left eye, and the broken line represents the quantity of light emitted to the visibility region of the right eye.

Figure 9A:
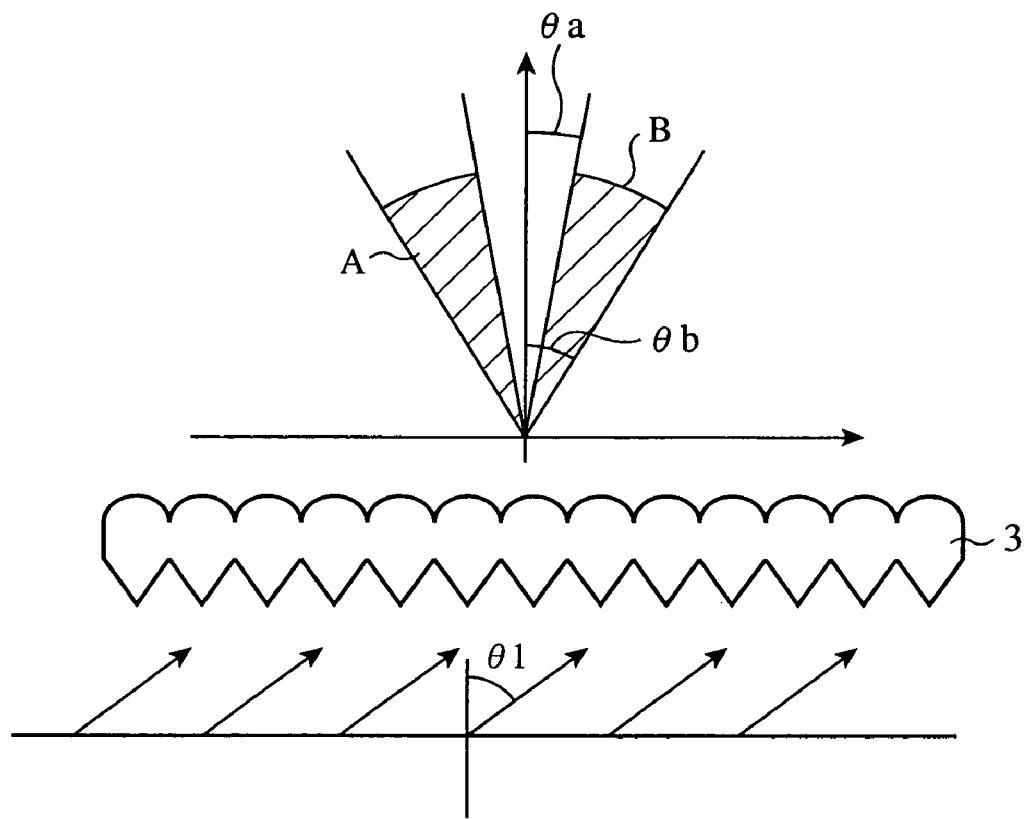
FIGS. 9A and 9B are structural diagrams each illustrating calculation conditions of the luminous intensity distribution characteristics of the double-sided prism sheet of the embodiment 1 in accordance with the present invention.
Figure 9B:
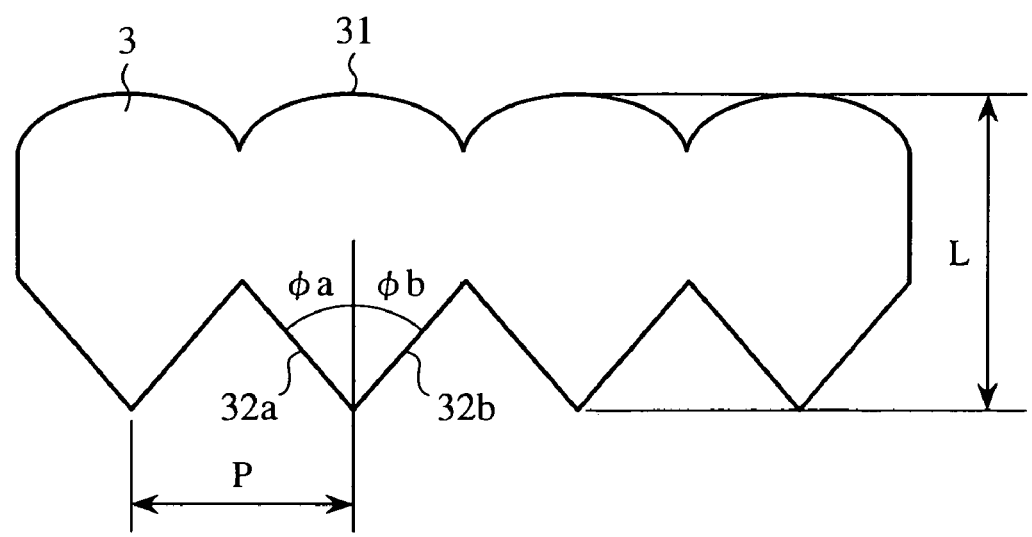

The simulation was carried out by launching light rays with a predetermined angle onto a single double-sided lens sheet 3 as shown in FIGS. 9A and 9B, and by calculating the angle distribution of the light emitted.

In FIGS. 9A and 9B, θ1 is the incident angle onto the double-sided prism sheet 3, and regions A and B are visibility regions of the two eyes in the ranges of θa=4.5 degrees and θb=10 degrees.

FIG. 8 shows the calculation results of the simulation of the double-sided lens sheet 3 composed of a material whose refractive index is about 1.5. As illustrated in FIG. 9B, each prism of the triangular prism 31 has angles φa=φb=30 degrees, the ratio between the pitch P and the thickness L of the triangular prism is 1:3, and the focal point of each lens of the cylindrical lens bank 31 coincides with the vertex of the triangular prism. The horizontal axis represents the incident angle of the light rays, and the vertical axis represents, in an arbitrary scale, the plots of quantity of light emitted to the visibility ranges corresponding to the two eyes from 4.5 degrees to 10 degrees leftward and from 4.5 degrees to 10 degrees rightward. In FIG. 8, the solid line represents the quantity of light emitted to the visibility region of the left eye, and the broken line indicates the quantity of light emitted to the visibility region of the right eye. The angle of incidence to the two eyes is determined by the viewing distance: it is about 9 degrees at the viewing distance 200 mm; about 6 degrees at 300 mm; and about 4.5 degrees at 400 mm. Here, a portable information apparatus is assumed, and the characteristics are evaluated at the emitted angle from 4.5 degrees to 10 degrees corresponding to the range from the viewing distance 200 mm to 400 mm. It is found from FIG. 8 that the light rays with the incident angles from 50 degrees to 80 degrees are emitted to the visibility ranges in the right and left directions, and that the light rays with the incident angles other than those are little emitted to the visibility ranges.

In the stereoscopic vision, the crosstalk between the right and left occurs if the light rays to be guided to the left eye reach the right eye, thereby deteriorating stereoscopic feeling. Accordingly, the stereoscopic vision is not achieved if the regions of the incident angles of the light rays to be guided to the two eyes overlap with each other. In addition, even if they do not overlap, if they are close to each other, it is necessary to launch the light rays with sharp luminous intensity distribution characteristics that will enable sufficient separation before launching into the sheet. In contrast with this, as for the characteristics as illustrated in FIG. 8, since a wide region exists, which does not emit light to either of the visibility ranges of the two eyes, between the incident angle ranges of ±40 degrees across the direction of the normal, the incident light rays onto the double-sided prism sheet 3 do not require particularly sharp luminous intensity distribution. Accordingly, it can obviate the need for a special configuration or complicated design of the light guiding plate 2 for controlling the luminous intensity distribution before the incidence onto the double-sided prism sheet 3.

Figure 10:
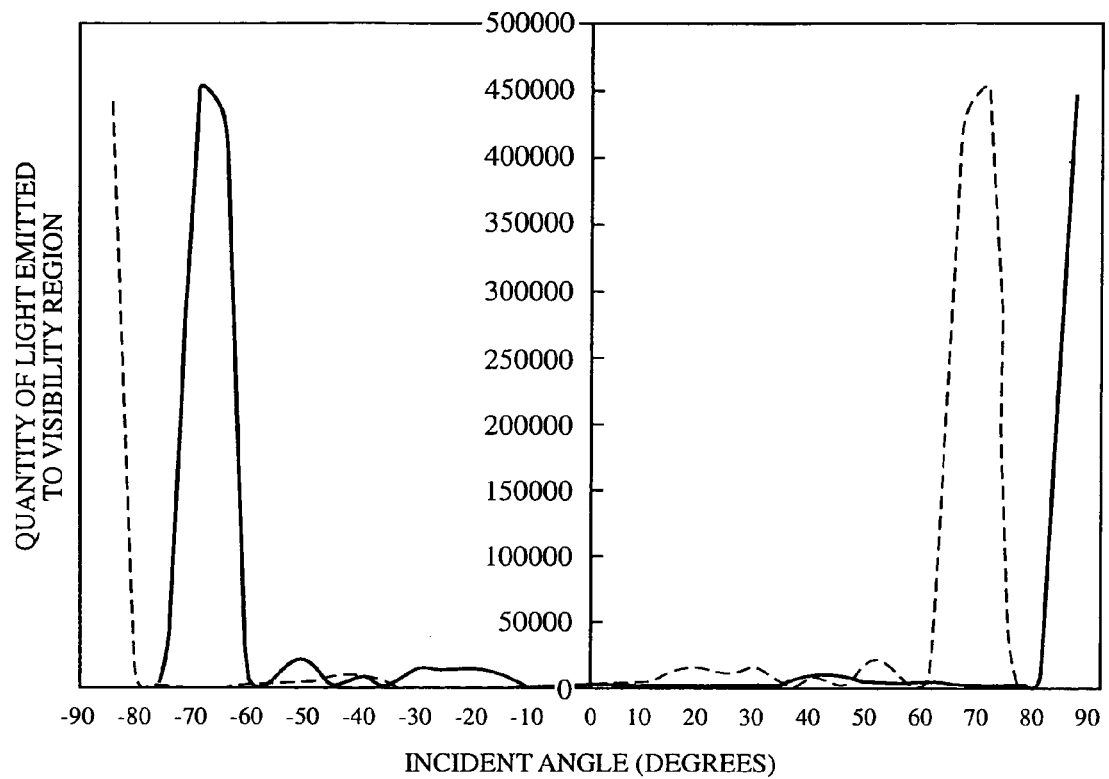
FIG. 10 is a diagram illustrating luminous intensity distribution characteristics of a prism sheet serving as a comparative example for explaining the embodiment 1 in accordance with the present invention.

FIG. 10 shows a comparative example of the luminous intensity distribution characteristics of a lens sheet without the cylindrical lens bank as disclosed in Japanese patent application laid-open No. 2001-66547. In FIG. 10, solid lines represent the quantity of light emitted to the visibility region of the left eye, and broken lines represent the quantity of light emitted to the visibility region of the right eye. The horizontal axis of FIG. 10 represents the incident angle onto the prism sheet, and the vertical axis represents the quantity of emitted light (arbitrary scale, and the values are those used by the simulation). In the structure of the lens sheet of the comparative example, the refractive index is 1.57, and the vertices of the prism are $\phi a=\phi b=34.5$ degrees as disclosed in Japanese patent application laid-open No. 2001-66547.

In FIG. 10, the ranges of the incident angle of the light rays to be guided to the two eyes are each rather narrow such as about 10 degrees in width. In addition, the light rays more inclined than those of the optimum region bring about light rays emitted toward the opposite eyes with an angle difference of about 5 degrees. As a result, it is necessary for the light rays emitted from the light guiding plate to have sharp luminous intensity distribution characteristics matching the optimum incident angle ranges. Thus, a complicated backlight structure must be used which has two V-shaped light guiding plates stacked.

Figure 11:
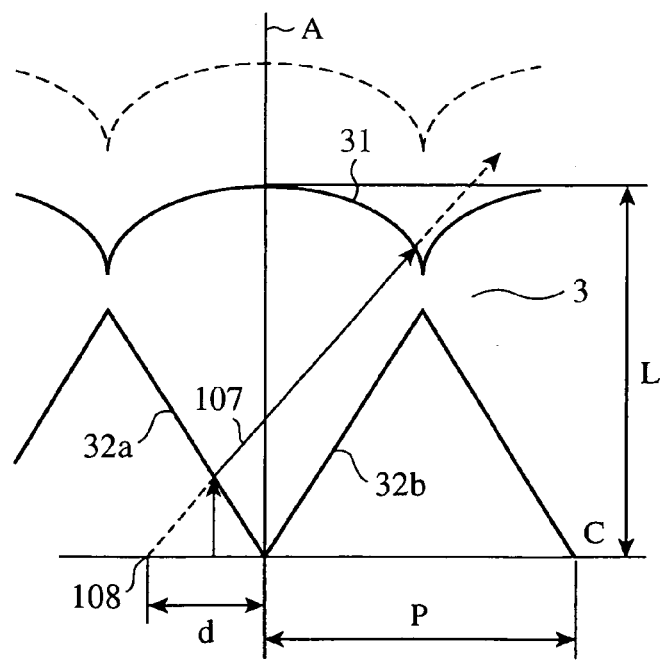
FIG. 11 is a structural diagram illustrating an optical path change due to the thickness and pitch of the double-sided prism sheet, which serves as a comparative example in the embodiment 1 in accordance with the present invention.

Since the thickness L and pitch P of the double-sided prism sheet 3 can vary the luminous intensity distribution, crosstalk can occur in some cases. For example, when the ratio between the pitch and thickness (thickness L/pitch P) is small, the light 107 that is launched into the cylindrical lens bank 31 directly from the slope 32a as illustrated in FIG. 11 can enter the visibility region. Broken lines of FIG. 11 show the structure when the ratio between the pitch and thickness (thickness L/pitch P) is three as in the foregoing example.

Figure 12:
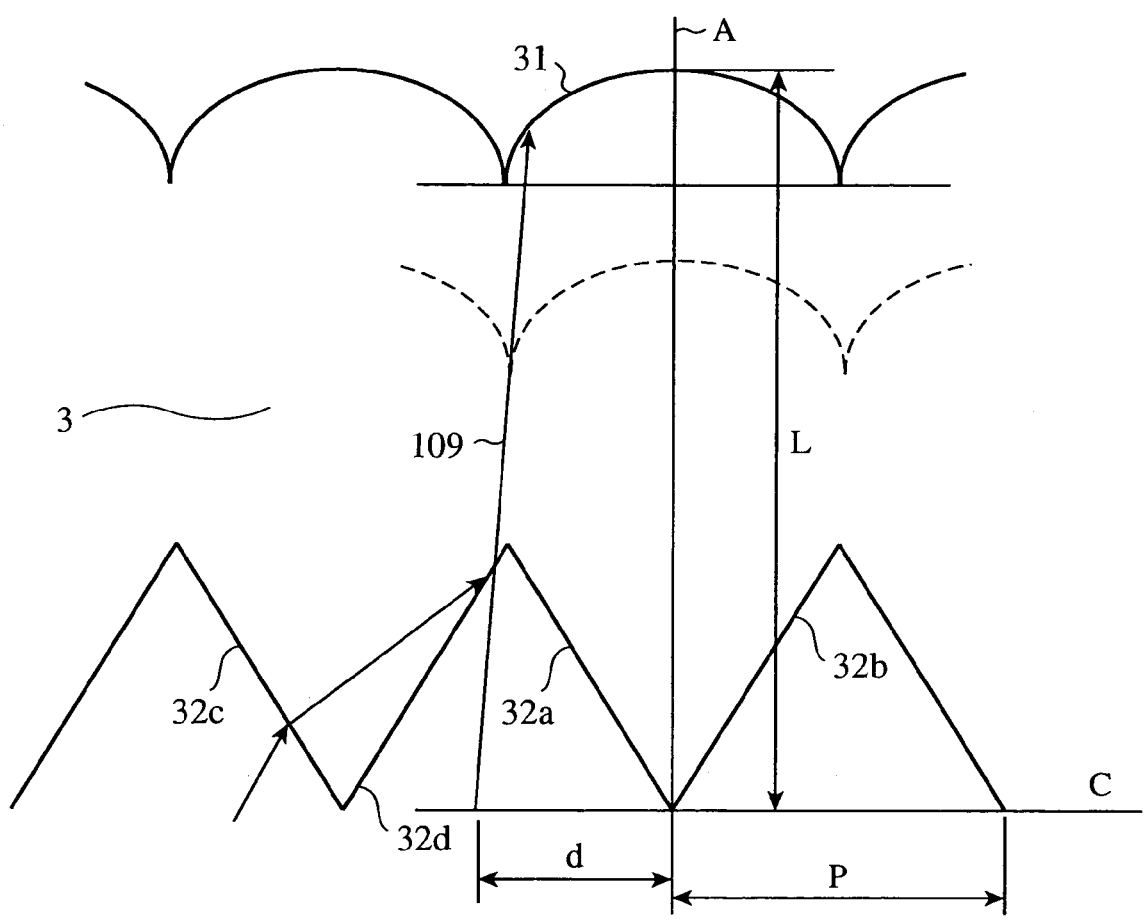
FIG. 12 is a structural diagram illustrating an optical path change due to the thickness and pitch of the double-sided prism sheet, which serves as a comparative example in the embodiment 1 in accordance with the present invention.

In addition, too large a ratio between the pitch and thickness can cause the total reflection by an adjacent slope 32d of the triangular prism bank 32 as illustrated in FIG. 12, which creates the possibility that the light 109 incident onto the cylindrical lens bank 31 can enter the visibility region. In either case, the crosstalk is likely to occur because the intersection point of the optical path line of the incident light onto the lens of the cylindrical lens bank and the horizontal plane C including the vertices of the prisms of the triangular prism bank is located at an opposite side to the light passing through the normal optical path with respect to the optical axis A. In FIG. 12, broken lines represent the case where the ratio between the pitch and thickness (thickness L/pitch P) is three just as the broken lines of FIG. 11.

Figure 13A:
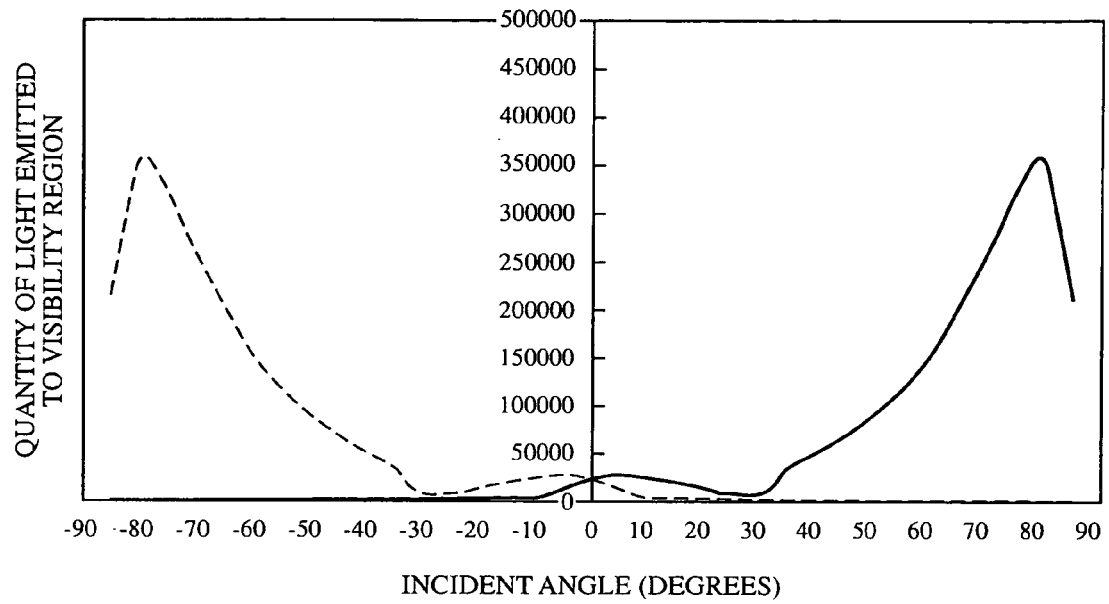
FIGS. 13A and 13B are diagrams each illustrating luminous intensity distribution characteristics when the thickness and pitch of the double-sided prism sheet vary in the embodiment 1 in accordance with the present invention.
Figure 13B:
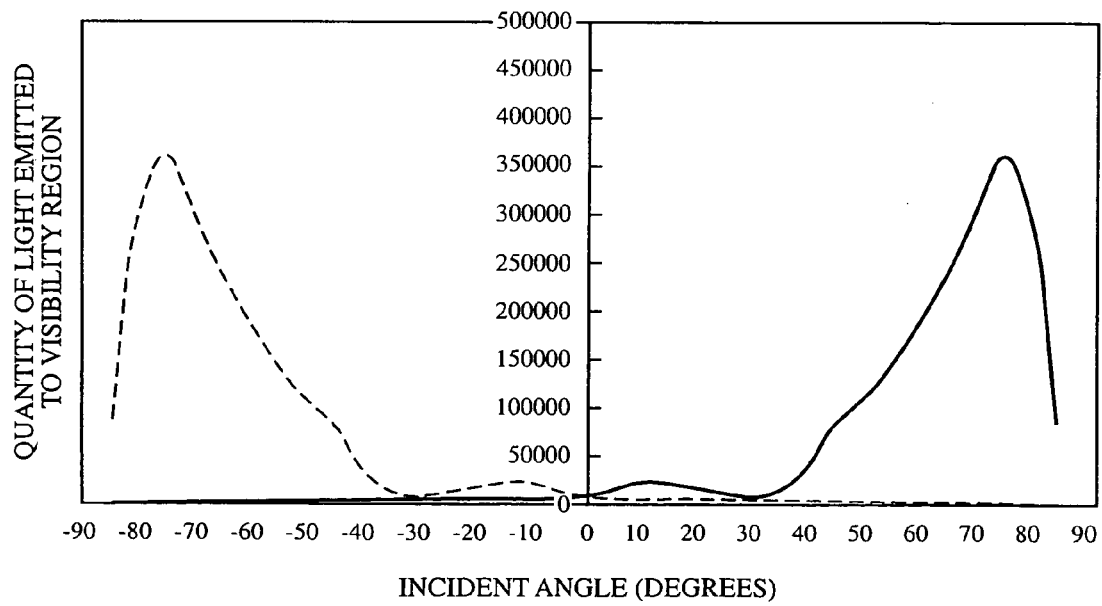
Figure 14A:
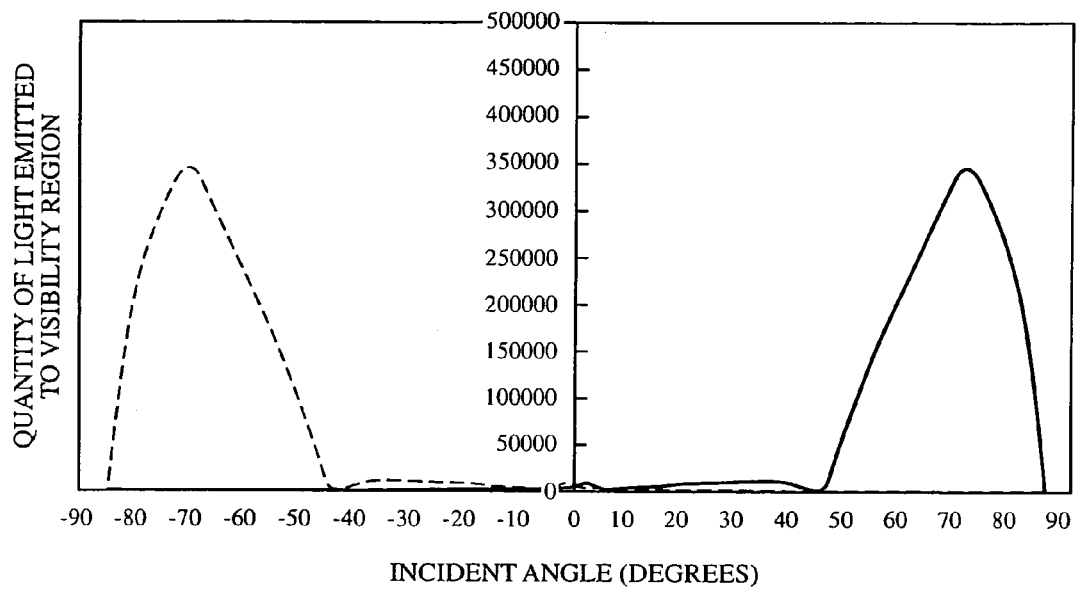
FIGS. 14A and 14B are diagrams each illustrating luminous intensity distribution characteristics when the thickness and pitch of the double-sided prism sheet vary in the embodiment 1 in accordance with the present invention.
Figure 14B:
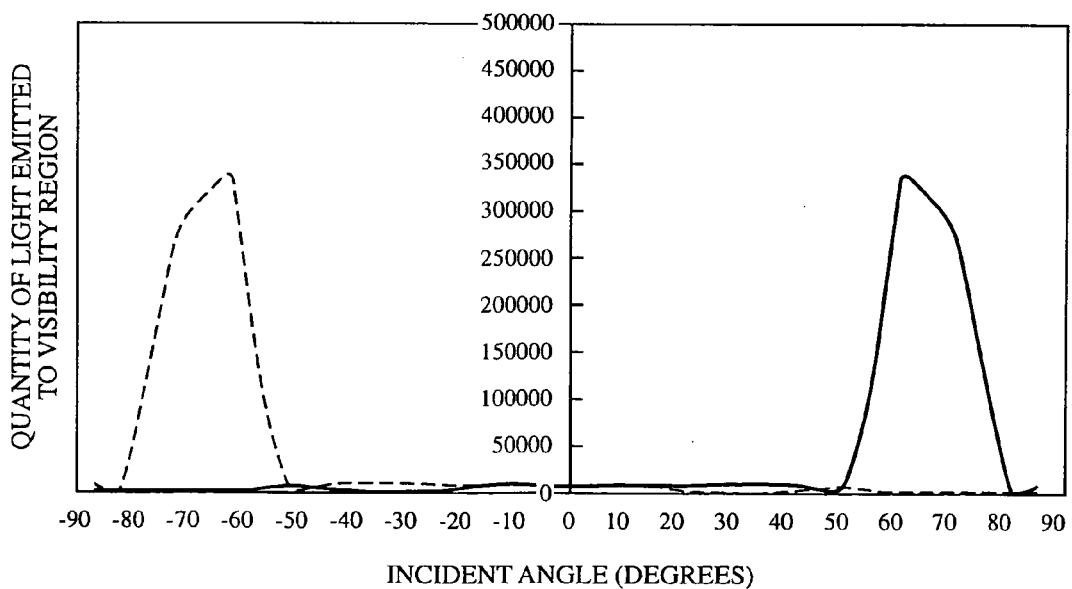
Figure 15A:
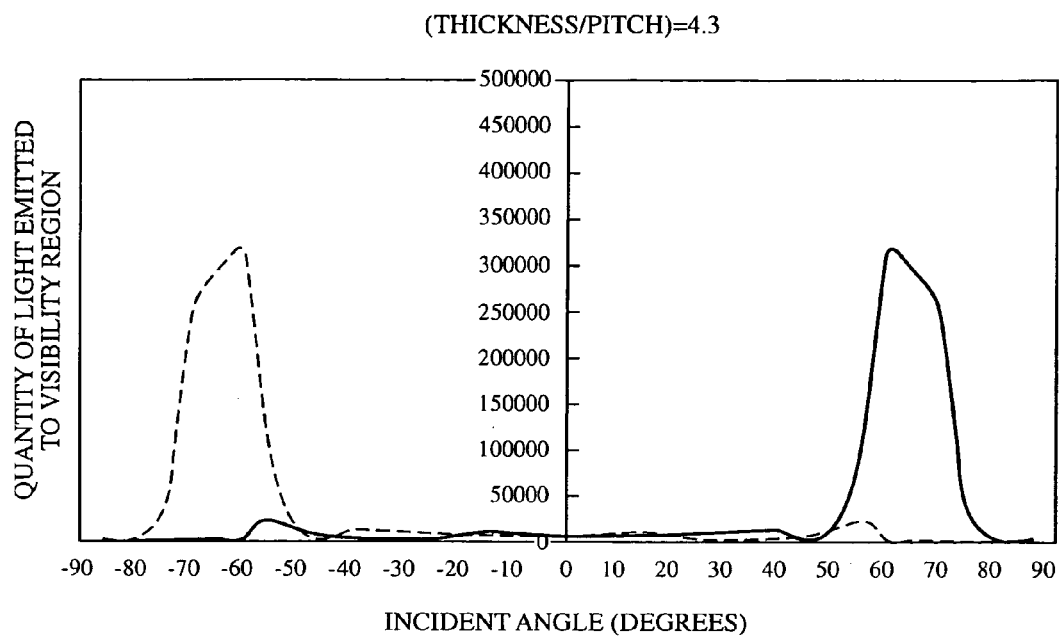
FIGS. 15A and 15B are diagrams each illustrating luminous intensity distribution characteristics when the thickness and pitch of the double-sided prism sheet vary in the embodiment 1 in accordance with the present invention.
Figure 15B:
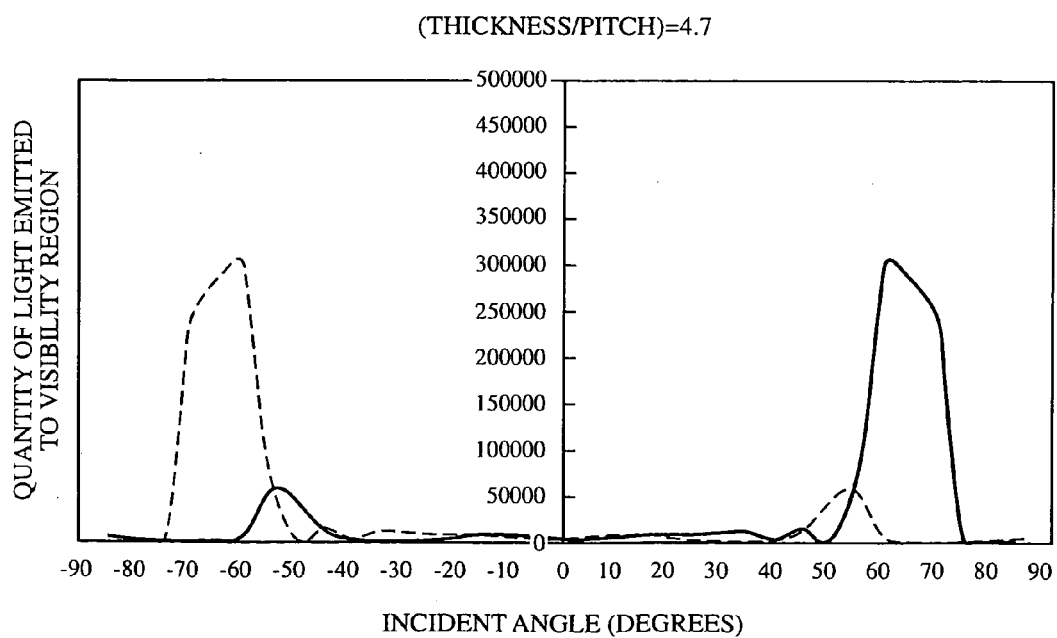

FIGS. 13A–15B illustrate the luminous intensity distribution characteristics of the double-sided prism sheet 3 plotted in the same manner as in FIG. 8 when the ratio between the pitch P and thickness L (thickness L/pitch P) of the double-sided prism sheet 3 is varied from 1.7 to 4.7. FIGS. 13A and 13B illustrate the luminous intensity distribution characteristics of the double-sided prism sheet 3 in the case where the ratio is 1.7 and 2.3; FIGS. 14A and 14B illustrate those in the case where the ratio is 2.7 and 4.0; and FIGS. 15A and 15B illustrate those in the case where the ratio is 4.3 and 4.7. In these figures, the horizontal axis represents the incident angle onto the double-sided prism sheet 3, and the vertical axis represents the quantity of emitted light (arbitrary scale, and the values are those used in the simulation). In addition, solid lines represent the quantity of light emitted to the left eye visibility region, and broken lines represent the quantity of light emitted to the right eye visibility region.

From FIGS. 13A–15B, it is found that in the case where the thickness/pitch ranges from 2.7 to 4.0, although the distribution of the visibility ranges varies slightly, the angle characteristics little vary which have the region that does not emit light to either right eye nor left eye over the incident angle of ±40 degrees. When the thickness/pitch is reduced from 2.7 to 2.3, a small peak appears in a range of incident angle from zero degree to about 30 degrees, and the peak grows considerably at 1.7. This is considered due to the effect of light with the optical path as the light 107 of FIG. 11. Such a peak of emitting light to the visibility region, which is present in that incident angle range, is undesirable because the region is narrowed which is effective for separating the right and left, and which does not emit light to the visibility range of either the right nor left eye. Furthermore, when the thickness/pitch is 4.3, a peak of the crosstalk appears in a range from 50 to 60 degrees in the incident angle, and the peak grows as the thickness/pitch increases. This is due to the effect of light with the optical path as the light 109 of FIG. 12. Thus, in the ranges in which the thickness/pitch is equal to or less than 2.3, or equal to or greater than 4.3, an increase of the crosstalk is expected. Accordingly, it is preferable that the thickness/pitch be in a range from about 2.5 to about 4.0. In this way, using the thickness/pitch in the range of about 2.5–4.0 enables high quality stereoscopic display.

Figure 16:
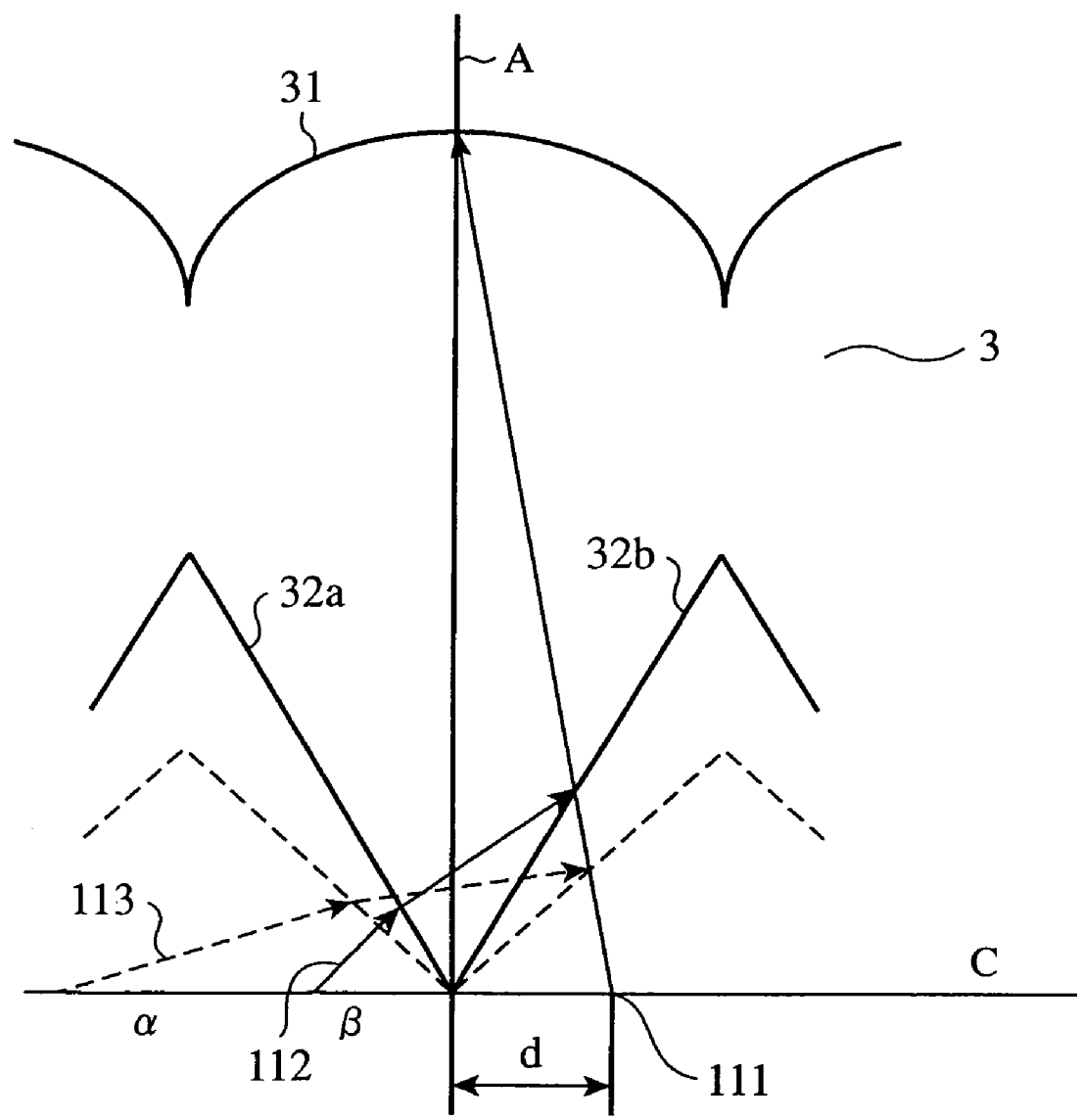
FIG. 16 is a structural diagram illustrating an optical path change by the prism angle of the triangular prism bank formed on the double-sided prism sheet in the embodiment 1 in accordance with the present invention.

Next, as shown in FIG. 16, when the vertices of the prisms of the triangular prism bank 32 formed on the double-sided prism sheet 3 vary from an angle indicated by the solid lines to an angle indicated by the broken lines, even two light rays passing through the same optical path after the total reflection by the slope 32b can pass through different optical paths such as optical paths 112 and 113 before the total reflection, thereby having different incident angles onto the double-sided lens sheet 3 such as α and β.

Accordingly, it can be considered that the range of the optimum incident angle for emitting light to the visibility region can change. The change in the range of the incident angle is undesirable because it can narrow the region that does not emit light to either the visibility range of the right eye nor that of the left eye, which allows the crosstalk to occur more easily, and because it can deteriorate the matching with the luminous intensity distribution of the backlight light guiding plate, which emits a large amount of light particularly in the range from 60 to 80 degrees as illustrated in FIG. 3A, and can reduce the efficiency.

Figure 17A:
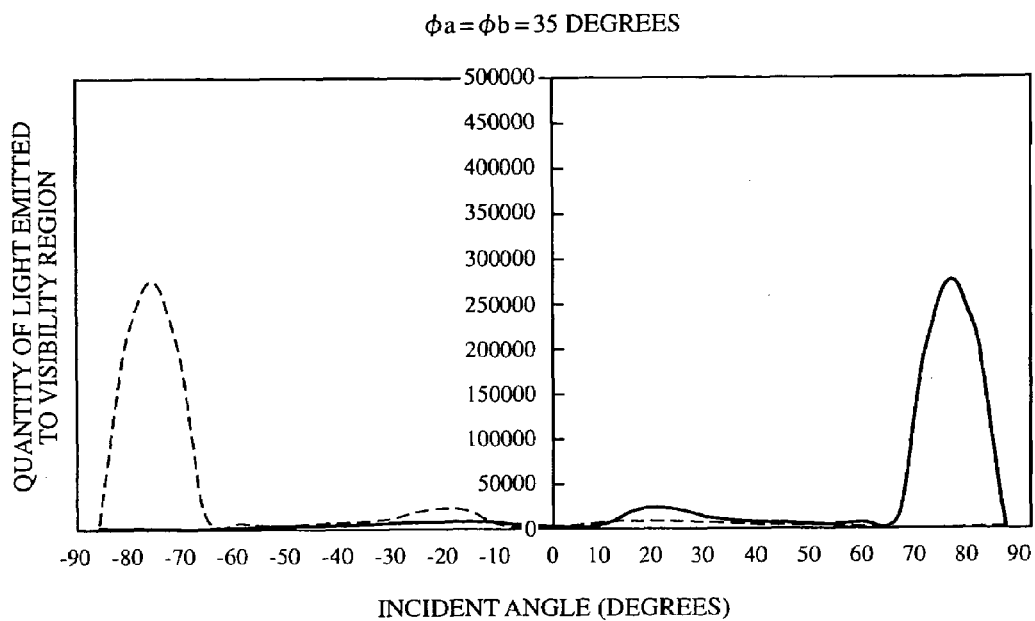
FIGS. 17A and 17B are diagrams each illustrating luminous intensity distribution characteristics when the prism angle varies of the triangular prism bank formed on the double-sided prism sheet in the embodiment 1 in accordance with the present invention.
Figure 19A:
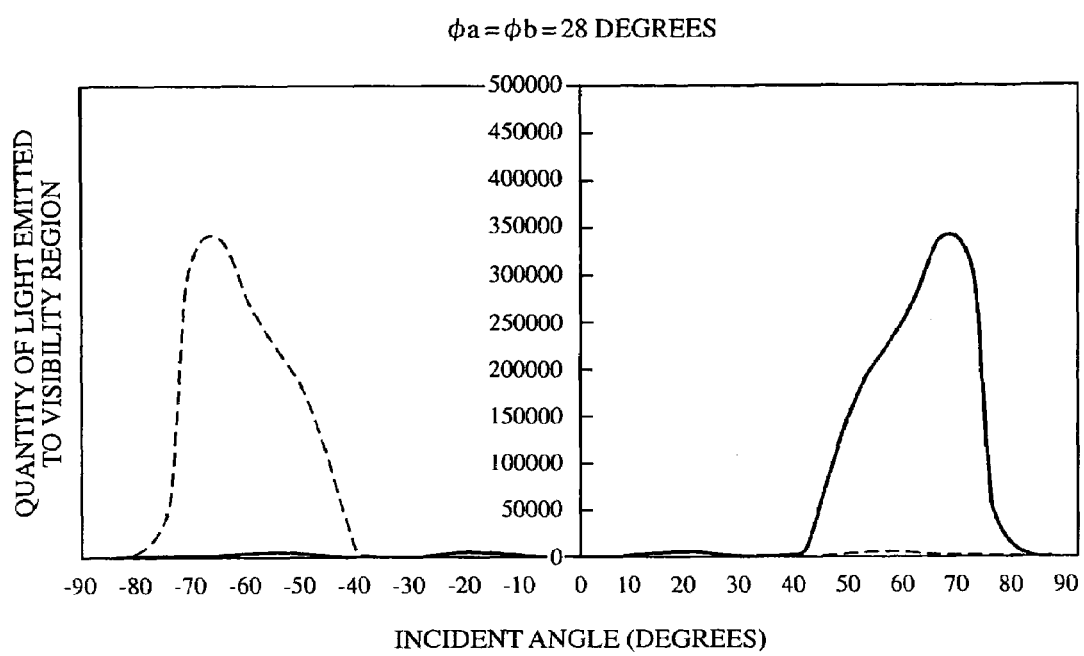
FIGS. 19A and 19B are diagrams each illustrating luminous intensity distribution characteristics when the prism angle varies of the triangular prism bank on the double-sided prism sheet in the embodiment 1 in accordance with the present invention.
Figure 19B:
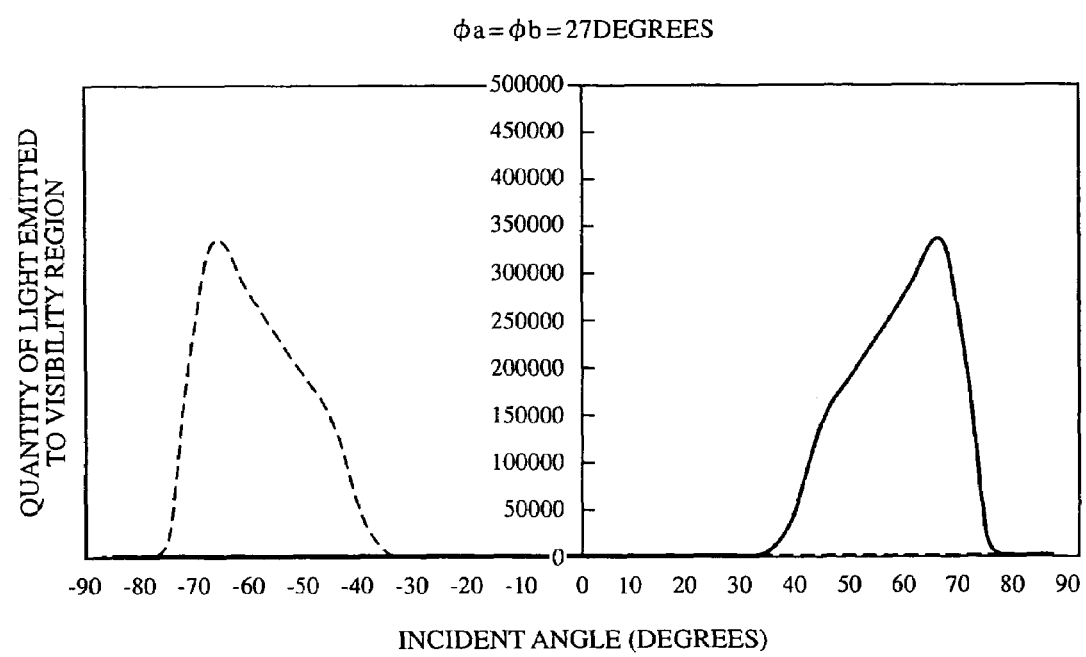

FIGS. 17A–19B illustrate the luminous intensity distribution characteristics of the double-sided prism sheet 3 which are plotted in the same manner as in FIG. 8 when the vertex φa=φb of the prisms of the triangular prism bank 31 is varied. FIGS. 17A and 17B illustrate the luminous intensity distribution characteristics of the double-sided prism sheet 3 when the vertex φa=φb of the prism is 35 degrees and 34 degrees; FIGS. 18A and 18B illustrate those when the vertex φa=φb of the prism is 31 degrees and 30 degrees; and FIGS. 19A and 19B illustrate those when the vertex φa=φb of the prism is 28 degrees and 27 degrees. Here, the horizontal axis of FIGS. 17A–19B represents the incident angle onto the double-sided prism sheet 3, and the vertical axis represents the quantity of emitted light (arbitrary scale, and the values are those used by the simulation). In addition, solid lines represent the quantity of light emitted to the visibility region of the left eye, and broken lines represent the quantity of light emitted to the visibility region of the right eye.

Figure 17B:
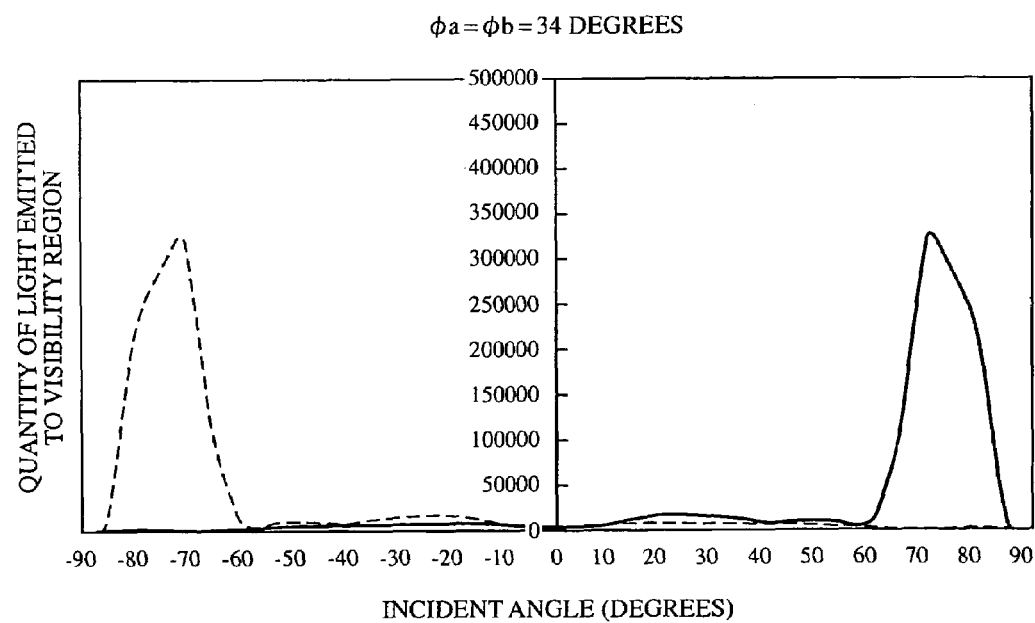
Figure 18A:
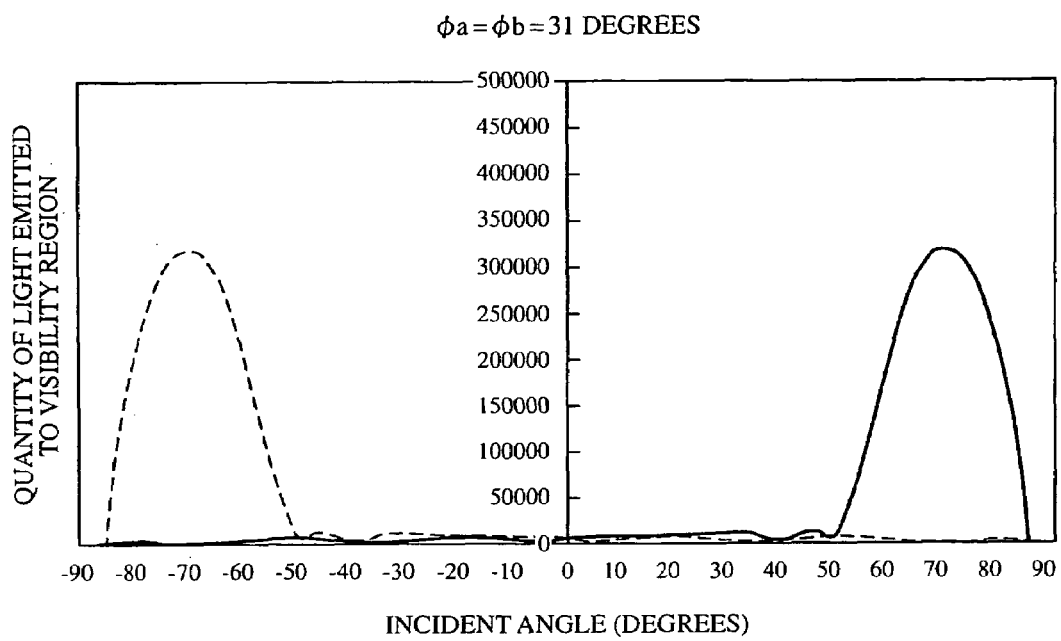
FIGS. 18A and 18B are diagrams each illustrating luminous intensity distribution characteristics when the prism angle varies of the triangular prism bank on the double-sided prism sheet in the embodiment 1 in accordance with the present invention.
Figure 18B:
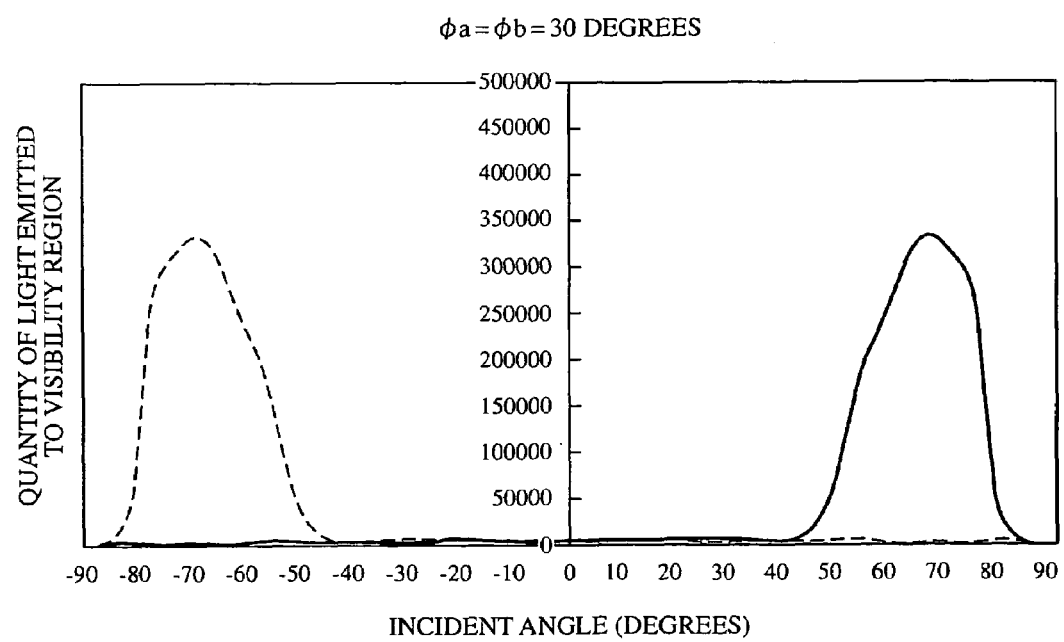

From FIGS. 17A–19B, it is found that when φa=φb is from 28 degrees of FIG. 19A to 34 degrees of FIG. 17B, the range of the incident angle of the visibility emission light covers almost all the range from 60 to 80 degrees in which a particularly large amount of light is emitted from the backlight. When φa=φb becomes equal to or greater than 31 degrees as shown in FIG. 18A, considering the region between ±40 degrees that do not emit light to either the visibility range of the right eye or that of the left eye, it is found that the ratio of the light emitted to the visibility ranges is tend to increase gradually. Therefore, it is preferable that φa=φb be at least in a range from 28 degrees to 34 degrees, and more preferably in a range from 28 degrees to 30 degrees.

The thus constructed vertices of the underside prisms of the double-sided prism sheet can further reduce the crosstalk, and increase the light efficiency of the light emitted from the backlight, thereby enabling bright, high quality stereoscopic display.

In this way, high quality stereoscopic vision can be performed with a simple configuration by switching the light sources 1a and 1b on and off alternately, by controlling the directivity of light using the double-sided prism sheet 3, and by displaying the right and left parallactic images on the transmissive liquid crystal panel 4 in synchronization with the switching. In addition, the display of a high quality plane image is also possible without deteriorating the resolution by turning on both the light sources 1a and 1b, and by displaying the image on the transmissive liquid crystal panel 4.

In the embodiment 1, although the focal point of each lens of the cylindrical lens bank 31 formed on the double-sided prism sheet 3 is set such that it coincides with the vertex of one of the prisms of the triangular prism bank 32 to control the angle of the emitted light, this is not essential. For example, a configuration is also possible in which the focal length of each lens of the cylindrical lens bank 31 is made shorter to transfer the virtual light source on the horizontal plane C including the vertices of the prisms of the triangular prism bank 32 at the position of the eyes of the observer. In addition, when the display region is sufficiently larger than the distance between the two eyes of the observer, good right and left separation characteristics can be achieved in the entire region of the wide surface by changing the pitch of the cylindrical lens bank 31 and triangular prism bank 32 in accordance with the position in the double-sided prism sheet 3.

The embodiment 1 described above offers advantages of being able to present the two eyes with high quality parallactic images with little crosstalk, and to implement a high quality display system without deterioration in the resolution in both the stereoscopic display and plane display.

As for the embodiment 1, it is difficult to change the pitch of the double-sided prism sheet 3, or the positional relationship between the cylindrical lens bank 31 and triangular prism bank 32 once they have been constructed. Thus, it is difficult to carry out the control of increasing the area of the stereoscopic vision by actively controlling the luminous intensity distribution characteristics in response to the position of the observer. As a result, it is particularly suitable for the portable information apparatus, the viewing position of which the observer can easily control with holding the apparatus in his or her hand.

Embodiment 2

Figure 20:
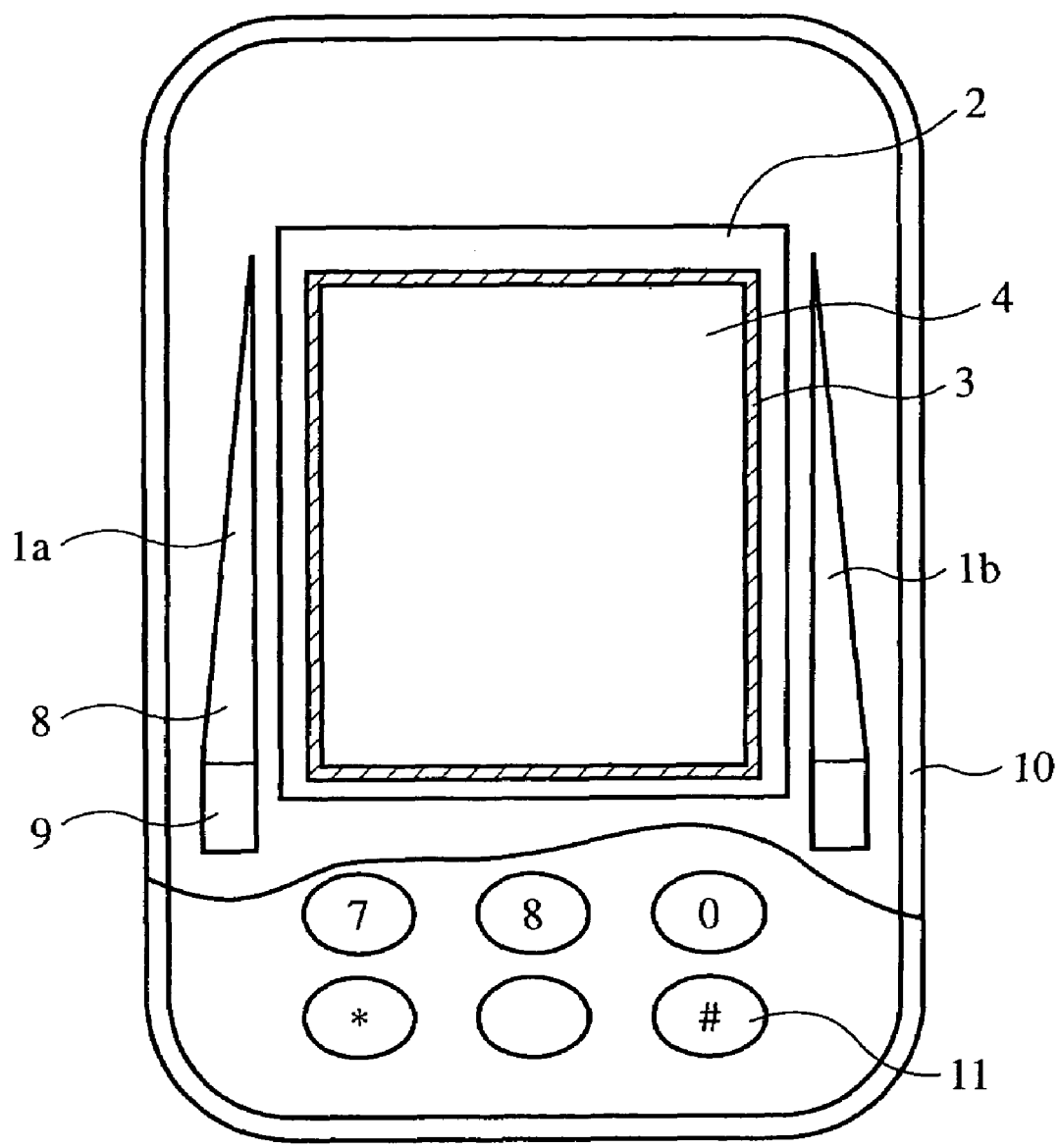
FIG. 20 is a front view illustrating an electronic information apparatus of an embodiment 2 in accordance with the present invention.

FIG. 20 is a front view illustrating an electronic information apparatus of an embodiment 2 in accordance with the present invention. Here, to describe the details of the display system, an interior portion of the electronic information apparatus is shown in the periphery of the display system.

In FIG. 20, the electronic information apparatus, a portable electronic notepad, has in its body 10 light sources 1a and 1b placed face to face on the right and left side of a light guiding plate 2. The light sources 1a and 1b include a light-emitting diode 8 and a light guide 9. The light output from the light-emitting diode 8, traveling through the light guide 9, gradually radiates toward the light guiding plate 2, thereby radiating uniformly to the sides of the light guiding plate 2.

The reference numeral 3 designates a double-sided prism sheet mounted on the emitting surface of the light guiding plate 2. The double-sided prism sheet 3 has a triangular prism bank and a cylindrical prism bank extending in the vertical direction. The reference numeral 4 designates a transmissive liquid crystal panel disposed on the double-sided prism sheet, and 11 designates buttons.

Next, the operation will be described with reference to FIG. 20. The light sources 1a and 1b are switched on an off alternately, and the synchronization control section 5 (not shown) causes the transmissive liquid crystal panel 4 to display right and left parallactic images in synchronization with the switching of the light sources 1a and 1b. Thus, when the observer is in front of the transmissive liquid crystal panel 4, the left eye 6a and the right eye 6b of the observer can perceive the parallactic images different from each other, thereby enabling the stereoscopic vision based on the parallax.

In addition, when the observer watches the transmissive liquid crystal panel not from the front, but from the right side at an oblique angle of 8 degrees with inclining the portable information terminal 10, the right eye is positioned at an angle of 16 degrees on the right side, and the left eye is positioned at an angle of 2 degrees on the right side. In this case, only the image for the right eye is perceived as the normal plane image by the two eyes. When the observer views from the left side at an oblique angle of 8 degrees, the left eye is positioned at an angle of 16 degrees on the left side, and the right eye is positioned at an angle of 2 degrees on the left side. In this case, only the image for the left eye is perceived as the normal plane image by the two eyes. Here, if two completely different images are displayed alternately in synchronization with the switching of the light sources 1a and 1b, the observer can recognize the two different images depending on the view angle.

Such a display function is effective to compare two images having completely different image data but have relationships in the contents, such as a map and guidance, a text of a mail and its attached file picture, pictures of two commodities, and specifications of two commodities, because they can be compared without any manual operation.

Embodiment 3

Figure 21:
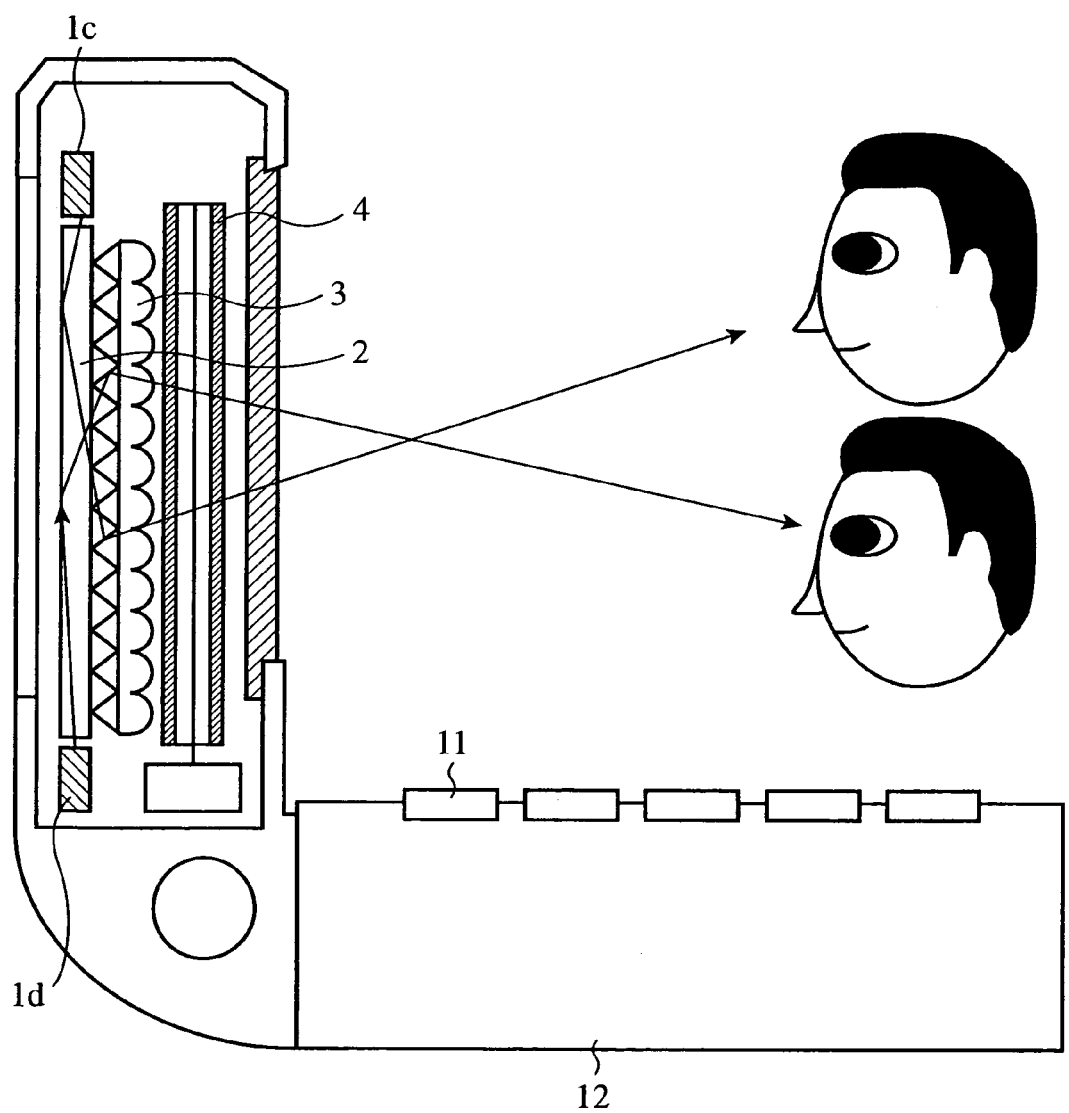
FIG. 21 is a structural diagram illustrating a portable telephone of an embodiment 3 in accordance with the present invention.
Figure 22:
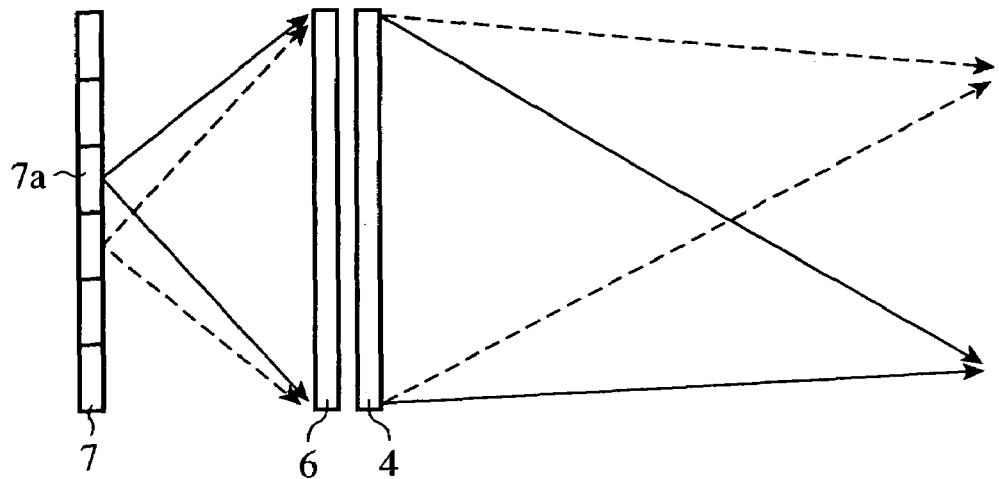
FIG. 22 is a structural diagram illustrating a conventional stereoscopic display system based on a light source array and a collimator lens.
Figure 23:
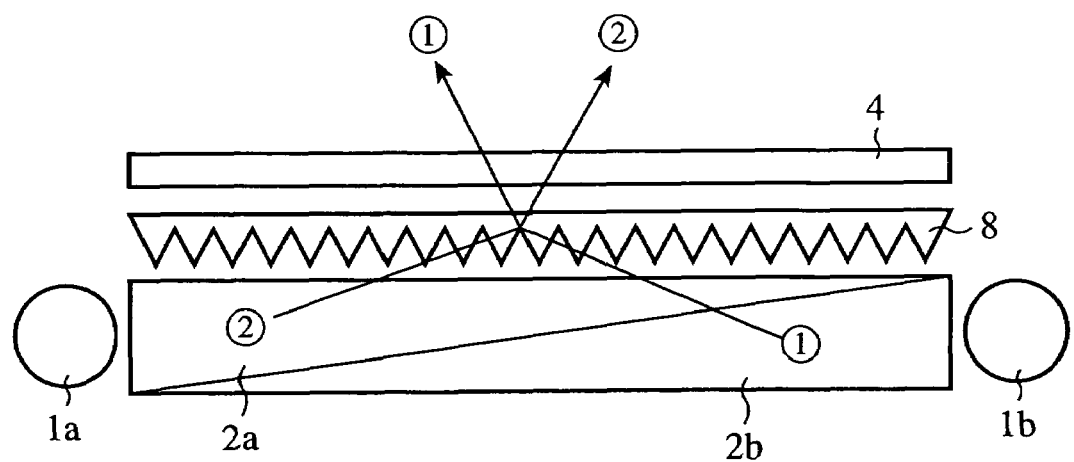
FIG. 23 is a side view illustrating a conventional stereoscopic display system based on backlight luminous intensity distribution control.

FIG. 21 is a structural diagram illustrating an electronic information apparatus and display system of an embodiment 3 in accordance with the present invention.

In FIG. 21, the electronic information apparatus, a portable telephone 12, includes a display system of the embodiment 1. The display system is disposed in such a fashion that it displays different images in upper and lower portions. In other words, the light sources 1c and 1d are placed opposingly at the top and bottom of the light guiding plate 2. The reference numeral 3 designates a double-sided prism sheet disposed on the emitting surface of the light guiding plate 2. The triangular prism bank and cylindrical prism bank of the double-sided prism sheet 3 extend in the lateral direction. The reference numeral 4 designates a transmissive liquid crystal panel mounted on the double-sided prism sheet. Since the other details of the display system are the same as those of the embodiment 1, their description is omitted here. The reference numeral 11 designates buttons.

Next, the operation will be described with reference to FIG. 21. The light sources 1c and id are turned on alternately, and the synchronization control section 5 (not shown) causes the transmissive liquid crystal panel 4 to display right and left parallactic images in synchronization with the switching of the light sources 1c and 1d. Thus, when the observer views the transmissive liquid crystal panel not from the front, but from above at an oblique angle between 2 degrees and 14 degrees, say at 6 degrees from above, with inclining the mobile phone 12, the two eyes are positioned at 6 degrees above. Accordingly, the observer can perceive only the image associated with the lighting of the upper light source 1c as the normal plane image. In contrast, when the observer views from below at an oblique angle between 2 degrees and 14 degrees, say at 6 degrees from below, the two eyes are positioned at 6 degrees below. Accordingly, the observer can perceive only the image associated with the lighting of the lower light source 1d as the normal plane image. Here, if two completely different images are displayed alternately in synchronization with the switching of the light sources 1c and 1d, the observer can recognize the two different images depending on the view angle.

As for the configuration having the upper and lower light sources, since the image is not different between the right and left, the two eyes perceive the same image simultaneously. Accordingly, the observer can view a single clear image without mixing two images in a wide angle range. In addition, since the visible angle is wide, it is not necessary for the observer to fix the wrist in a narrow angle, which makes it easier to hold the portable telephone.

Incidentally, it is obvious that the observer can view the stereoscopic image by rotating the portable telephone of FIG. 21 to the lateral direction, and by viewing the transmissive liquid crystal panel of the portable telephone 12 displaying two parallactic images from the front. In this case, it is necessary to display the parallactic images in such a manner that the up and down direction of the images are displayed correctly when the telephone is turned to the lateral direction in which the parallactic image for the right eye enters the right eye, and that for the left eye enters the left eye.

In addition, although the present embodiment is described by way of example of the portable telephone, it is obvious that it is applicable to other portable information terminals.

INDUSTRIAL APPLICABILITY

According to the present invention, a display system can be achieved which is capable of performing stereoscopic vision and displaying different frames on the same screen simultaneously, which is suitable for the portable information terminals.

What is claimed is:

1. A display system comprising:
a light guiding plate having opposed light input ends and a light emitting face transverse to the light input ends;
respective light sources respectively disposed at said opposed light input ends of said light guiding plate;
a double-sided prism sheet that is disposed on a light emitting face side of said light guiding plate, and that has on a first surface, facing said light guiding plate, a triangular prism bank including a plurality of contiguous triangular prisms having respective vertices facing said light guiding plate and extending in a direction parallel to the light input ends of said light guiding plate, and, on a second surface, opposite the first surface, a cylindrical lens bank including a plurality of contiguous cylindrical lenses having respective focal points and extending in a direction parallel to said triangular prism bank, wherein corresponding pairs of focal points of said cylindrical lenses and vertices of said triangular prisms coincide;
a transmissive display panel disposed on a second side of said double-sided prism sheet; and
a synchronization driving section causing said transmissive display panel to display two different images in synchronization with operation of said respective light sources, wherein light from operation of said respective light sources is respectively emitted from said transmissive display panel along respective divergent first and second directions, respectively.

2. The display system according to claim 1, wherein the light from said respective light sources is emitted from said transmissive display panel at angles corresponding to right and left parallax, respectively.

3. The display system according to claim 1, wherein a ratio of thickness of said double-sided prism sheet to pitch of said cylindrical lenses is in a range from 2.5 to 4.

4. The display system according to claim 1, wherein said triangular prisms have a substantially uniform vertex angle, the vertex angle ranging from 56 degrees to 68 degrees.

5. An electronic apparatus comprising a display system as defined in claim 1.

6. The display system according to claim 1, wherein said light guiding plate has a rectangular cross-section in a plane perpendicular to the direction parallel to said triangular prism bank.

7. The display system according to claim 1, wherein the ratio of said triangular prisms to said cylindrical lenses is 1:1.

* * * * *